US009806751B2

(12) United States Patent
Hobson et al.

(10) Patent No.: US 9,806,751 B2
(45) Date of Patent: Oct. 31, 2017

(54) HANDHELD ELECTRONIC TOUCH SCREEN COMMUNICATION DEVICE

(71) Applicant: Apple Inc., Cupertino, CA (US)

(72) Inventors: Phillip Michael Hobson, Menlo Park, CA (US); Erik L. Wang, Redwood City, CA (US); Kenneth A. Jenks, Capitola, CA (US); Robert J. Hill, Salinas, CA (US); Robert W. Schlub, Campbell, CA (US); Richard Hung Minh Dinh, Santa Clara, CA (US); Tang Yew Tan, Cupertino, CA (US); Adam D. Mittleman, Redwood City, CA (US); Bartley K. Andre, Palo Alto, CA (US); Daniel J. Coster, San Francisco, CA (US); Daniele de Iuliis, San Francisco, CA (US); Richard P. Howarth, San Francisco, CA (US); Jonathan P. Ive, San Francisco, CA (US); Steven P. Jobs, Palo Alto, CA (US); Duncan Robert Kerr, San Francisco, CA (US); Shin Nishibori, Kailua, HI (US); Matthew Dean Rohrbach, San Francisco, CA (US); Douglas B. Satzger, San Francisco, CA (US); Calvin Q. Seid, Palo Alto, CA (US); Christopher J. Stringer, Woodside, CA (US); Eugene Antony Whang, San Francisco, CA (US); Rico L. Zörkendörfer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/226,086

(22) Filed: Aug. 2, 2016

(65) Prior Publication Data

US 2017/0170857 A1  Jun. 15, 2017

Related U.S. Application Data

(63) Continuation-in-part of application No. 14/266,570, filed on Apr. 30, 2014, which is a continuation of
(Continued)

(51) Int. Cl.
*H04B 1/3827* (2015.01)
*G06F 3/041* (2006.01)
(Continued)

(52) U.S. Cl.
CPC ......... *H04B 1/3833* (2013.01); *G06F 3/0412* (2013.01); *H04M 1/0266* (2013.01);
(Continued)

(58) Field of Classification Search
CPC ........................... G06F 3/0412; H04B 1/3833
See application file for complete search history.

(56) References Cited

U.S. PATENT DOCUMENTS 3,414,902 A   12/1968  Hugh
3,546,365 A   12/1970  Covell et al.
(Continued)

OTHER PUBLICATIONS

U.S. Appl. No. 14/158,403 , "Non-Final Office Action", Apr. 8, 2016, 10 pages.
(Continued)

*Primary Examiner* — Tuan H Nguyen
(74) *Attorney, Agent, or Firm* — Kilpatrick Townsend & Stockton LLP

(57) ABSTRACT

A handheld electronic device may be provided that contains a conductive housing and other conductive elements. Transceiver circuitry, such as radio frequency (RF) transceiver
(Continued)

circuitry configured to transmit and receive RF signals, may be connected to the resonating elements by transmission lines such as coaxial cables. The electronic device may have an integrated touch screen display in which a user can control the device by interacting directly with the display.

20 Claims, 24 Drawing Sheets

Related U.S. Application Data application No. 14/158,403, filed on Jan. 17, 2014, which is a continuation of application No. 13/021,689, filed on Feb. 4, 2011, now Pat. No. 8,681,056, which is a continuation of application No. 11/821,329, filed on Jun. 21, 2007, now Pat. No. 7,889,139.

(51) Int. Cl.
*H04M 1/02* (2006.01)
*H04M 1/03* (2006.01)

(52) U.S. Cl.
CPC .......... *H04M 1/03* (2013.01); *H04M 2250/22* (2013.01); *H04M 2250/74* (2013.01)

(56) References Cited

U.S. PATENT DOCUMENTS

| | | | |
|---|---|---|---|
| 3,573,628 A | 4/1971 | Yackish et al. | |
| 3,648,000 A | 3/1972 | Thompson | |
| 3,858,019 A | 12/1974 | Muri et al. | |
| 4,127,752 A | 11/1978 | Lowthorp et al. | |
| 4,636,698 A | 1/1987 | Leclercq et al. | |
| 4,723,305 A | 2/1988 | Phillips et al. | |
| 5,181,044 A | 1/1993 | Matsumoto et al. | |
| 5,650,834 A | 7/1997 | Nakagawa et al. | |
| 5,713,466 A | 2/1998 | Tajima | |
| 5,777,583 A | 7/1998 | Canora et al. | |
| 5,798,984 A | 8/1998 | Koch | |
| 5,982,355 A | 11/1999 | Jaeger et al. | |
| 6,308,084 B1 | 10/2001 | Lonka et al. | |
| 6,542,128 B1 | 4/2003 | Johnson et al. | |
| 6,714,778 B2 | 3/2004 | Nykänen et al. | |
| 6,931,125 B2 | 8/2005 | Smallwood et al. | |
| 7,110,797 B2 | 9/2006 | Soejima et al. | |
| 7,158,122 B2 | 1/2007 | Roberts et al. | |
| 7,181,172 B2 | 2/2007 | Sullivan et al. | |
| 7,202,825 B2 | 4/2007 | Leizerovich et al. | |
| 7,271,772 B2 | 9/2007 | Jarmuszewski et al. | |
| 7,280,100 B2 | 10/2007 | Hanson et al. | |
| 7,292,193 B2 | 11/2007 | Jang et al. | |
| 7,467,001 B2 | 12/2008 | Wu et al. | |
| 7,639,187 B2 | 12/2009 | Caballero et al. | |
| 7,663,878 B2 * | 2/2010 | Swan ................... | G06F 1/1632 361/679.3 |
| 7,688,267 B2 | 3/2010 | Hill et al. | |
| 7,889,139 B2 * | 2/2011 | Hobson ................. | H01Q 1/243 343/702 |
| 2006/0244663 A1 | 11/2006 | Fleck et al. | |

OTHER PUBLICATIONS

U.S. Appl. No. 14/266,532, "Final Office Action", Jun. 24, 2015, 17 pages.
U.S. Appl. No. 14/266,561, "Final Office Action", Feb. 16, 2016, 16 pages.
U.S. Appl. No. 14/266,567, "Final Office Action", Dec. 3, 2015, 18 pages.
U.S. Appl. No. 14/266,570, "Non-Final Office Action", Jan. 15, 2016, 13 pages.
cnet.com, "Cambridge Soundworks Radio 730", https://youtube.com/watchv=IVsko2j1zN8.
youtube.com, "Cambridge Soundworks 740 function demo".
youtube.com, "Cambridge Soundworks Sound system 745".

* cited by examiner

HANDHELD ELECTRONIC TOUCH SCREEN COMMUNICATION DEVICE

CROSS-REFERENCES TO RELATED APPLICATIONS

This application is a Continuation-in-Part of patent application Ser. No. 14/266,570, filed Apr. 30, 2014 which is a Continuation of patent application Ser. No. 14/158,403, filed Jan. 17, 2014, which is a Continuation of patent application Ser. No. 13/021,689, filed Feb. 4, 2011, now U.S. Pat. No. 8,681,056, granted Mar. 25, 2014, which is a Continuation of patent application Ser. No. 11/821,329, filed Jun. 21, 2007, now U.S. Pat. No. 7,889,139, granted Feb. 15, 2011, which are hereby incorporated by reference herein in their entireties.

TECHNICAL FIELD

Embodiments of the invention relate generally to wireless communications, and more particularly, to wireless communications circuitry for handheld electronic devices.

BACKGROUND

Handheld electronic devices are becoming increasingly popular. Examples of handheld devices include handheld computers, cellular telephones, media players, and hybrid devices that include the functionality of multiple devices of this type.

Due in part to their mobile nature, handheld electronic devices are often provided with wireless communications capabilities. Handheld electronic devices may use wireless communications to communicate with wireless base stations. For example, cellular telephones may communicate using cellular telephone bands at 850 MHz, 900 MHz, 1800 MHz, and 1900 MHz (e.g., the main Global System for Mobile Communications or GSM cellular telephone bands). Handheld electronic devices may also use other types of communications links. For example, handheld electronic devices may communicate using the WiFi® (IEEE 802.11) band at 2.4 GHz and the Bluetooth® band at 2.4 GHz. Communications are also possible in data service bands such as the 3G data communications band at 2170 MHz band (commonly referred to as UMTS or Universal Mobile Telecommunications System).

To satisfy consumer demand for small form factor wireless devices, manufacturers are continually striving to reduce the size of components that are used in these devices. It would therefore be desirable to be able to provide improved handheld electronic devices.

SUMMARY

In accordance with an embodiment of the present invention, a handheld electronic device with wireless communications circuitry is provided. The handheld electronic device may have cellular telephone, music player, or handheld computer functionality. The wireless communications circuitry may have one or more transceivers. The transceivers may be used to support wireless communications over data communications bands and cellular telephone communications bands.

The handheld electronic device may have a housing. The front face of the housing may have a display. The display may be a liquid crystal diode (LCD) display or other suitable display. The display may define the front of the handheld electronic device and be planar with the front of the handheld electronic device. A touch sensor may be integrated into the display to make the display touch sensitive.

A bezel may be used to attach the display to the housing. The bezel may surround the periphery of the front face of the housing and may hold the display against the housing. The bezel may be planar with the front of the handheld electronic device.

The bezel and at least a portion of the housing may be formed from metal or other conductive materials. Electrical components, such as the display, printed circuit boards, integrated circuits, and a housing frame may be grounded together to form a ground plane.

The handheld electronic device may have transceiver circuitry for handling wireless communications signals. With one illustrative arrangement, the handheld electronic device may have first and second radio-frequency transceivers and first and second corresponding resonating elements. The first resonating element may be used with the ground plane to perform cellular telephone functionality. The second resonating element may be used with the ground plane to form a data band functionality (e.g., at 2.4 GHz). The resonating elements may be located over the slot in the ground plane.

Electrical components such as a menu button or other user interface control, a speaker module, and a microphone module, may be placed in an overlapping relationship with a transceiver slot and one or more resonating elements. To prevent interference between the transceivers and these overlapping electrical components, the overlapping electrical components may be isolated using isolation elements. Inductors or resistors may be used for the isolation elements.

Further features of the invention, its nature and various advantages will be more apparent from the accompanying drawings and the following detailed description of the preferred embodiments.

DETAILED DESCRIPTION OF THE INVENTION

The present invention relates generally to wireless communications, and more particularly, to wireless electronic touch screen communication devices.

The wireless electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, which is sometimes described herein as an example, the portable electronic devices are handheld electronic devices.

The handheld devices may be, for example, cellular telephones, media players with wireless communications capabilities, handheld computers (also sometimes called personal digital assistants), remote controllers, global positioning system (GPS) devices, and handheld gaming devices. The handheld devices may also be hybrid devices that combine the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, and supports web browsing. These are merely illustrative examples.

Figure 1:
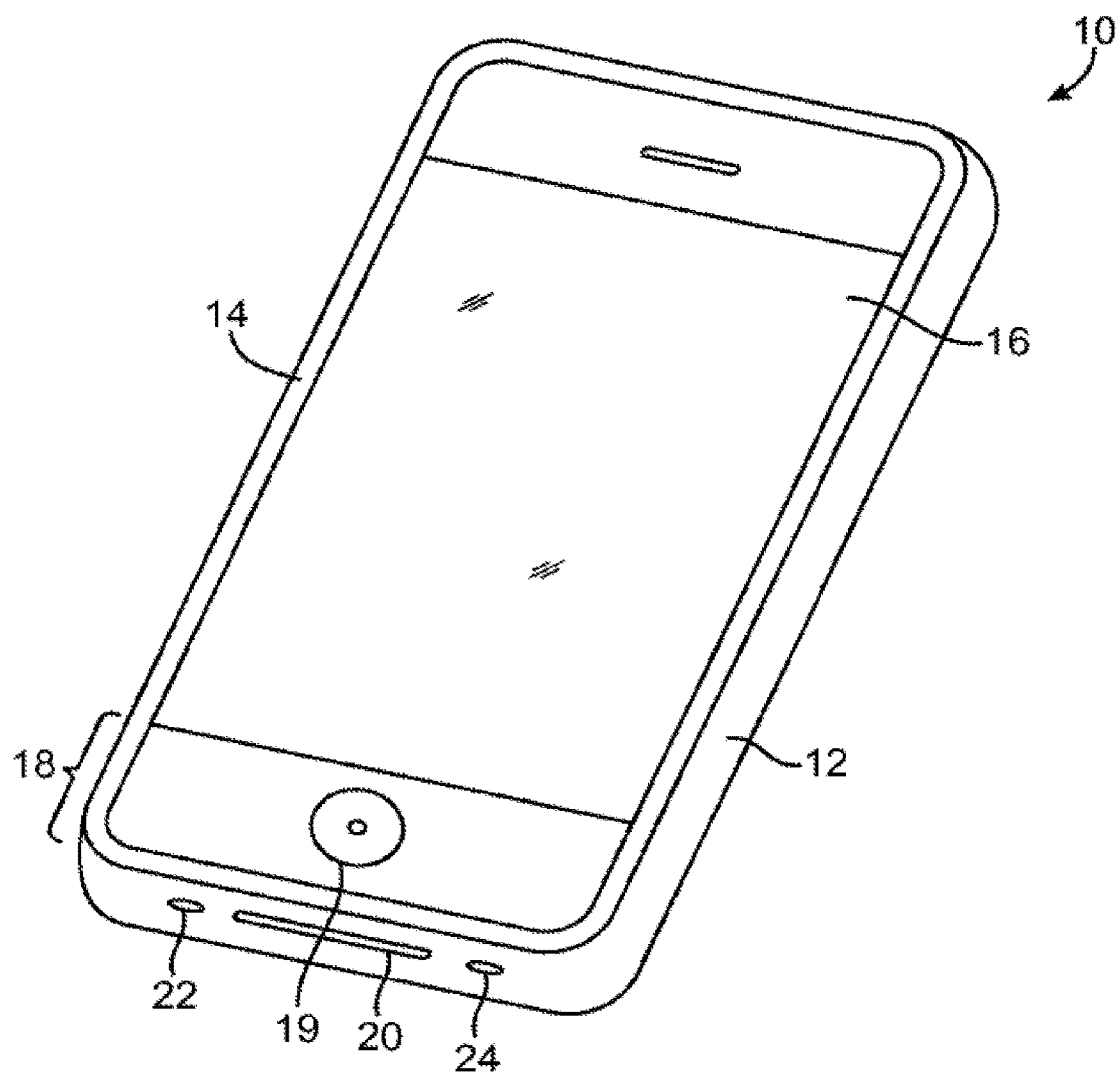
FIG. 1 is a perspective view of an illustrative handheld electronic device in accordance with an embodiment of the present invention.

An illustrative handheld electronic device in accordance with an embodiment of the present invention is shown in FIG. 1. Device 10 may be any suitable portable or handheld electronic device.

Device 10 may have housing 12. Device 10 may include one or more transceivers for handling wireless communications. The transceivers may comprise or may function separately from one or more antennas.

Device 10 may handle communications over one or more communications bands. For example, in a device 10 with two transceivers, a first of the two transceivers may be used to handle cellular telephone communications in one or more frequency bands, whereas a second of the two transceivers may be used to handle data communications in a separate communications band. With one suitable arrangement, which is sometimes described herein as an example, the second transceiver is configured to handle data communications in a communications band centered at 2.4 GHz (e.g., WiFi and/or Bluetooth frequencies). In configurations with multiple transceivers, the transceivers may be designed to reduce interference so as to allow the two transceivers to operate in relatively close proximity to each other.

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material, so that the operation of conductive transceiver elements that are located in proximity to housing 12 is not disrupted. Housing 12 or portions of housing 12 may also be formed from conductive materials such as metal. An illustrative housing material that may be used is anodized aluminum. Aluminum is relatively light in weight and, when anodized, has an attractive insulating and scratch-resistant surface. If desired, other metals can be used for the housing of device 10, such as stainless steel, magnesium, titanium, alloys of these metals and other metals, etc. In scenarios in which housing 12 is formed from metal elements, one or more of the metal elements may be used as part of the transceivers in device 10. For example, metal portions of housing 12 may be shorted to an internal ground plane in device 10 to create a larger ground plane element for that device 10. To facilitate electrical contact between an anodized aluminum housing and other metal components in device 10, portions of the anodized surface layer of the anodized aluminum housing may be selectively removed during the manufacturing process (e.g., by laser etching).

Housing 12 may have a bezel 14. The bezel 14 may be formed from a conductive material. The conductive material may be a metal (e.g., an elemental metal or an alloy) or other suitable conductive materials. With one suitable arrangement, which is sometimes described herein as an example, bezel 14 may be formed from stainless steel. Stainless steel can be manufactured so that it has an attractive shiny appearance, is structurally strong, and does not corrode easily. If desired, other structures may be used to form bezel 14. For example, bezel 14 may be formed from plastic that is coated with a shiny coating of metal or other suitable substances. Arrangements in which bezel 14 is formed from a conductive metal such as stainless steel are often described herein as an example.

Bezel 14 may serve to hold a display or other device with a planar surface in place on device 10. Bezel 14 may also form a planar surface on the front of device 10. As shown in FIG. 1, for example, bezel 14 may be used to hold display 16 in place by attaching display 16 to housing 12. Device 10 may have front and rear planar surfaces. In the example of FIG. 1, display 16 is shown as being formed as part of the planar front surface of device 10. The periphery of the front surface may be surrounded by a bezel, such as bezel 14. If desired, the periphery of the rear surface may be surrounded by a bezel (e.g., in a device with both front and rear displays).

Display 16 may be a liquid crystal diode (LCD) display, an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

In use, when display 16 is a touch screen, the touch screen may display one or more graphics within a user interface. In this embodiment, as well as others described below, a user may select one or more of the graphics by making contact or touching the graphics, for example, with one or more fingers. In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 10. In some embodiments, inadvertent contact with a graphic may not select the graphic. For example, a swipe gesture that sweeps over an application icon may not select the corresponding application when the gesture corresponding to selection is a tap.

In a typical arrangement, bezel 14 may have prongs that are used to secure bezel 14 to housing 12 and that are used to electrically connect bezel 14 to housing 12 and other conductive elements in device 10. The housing and other conductive elements form a ground plane for the transceiver (s) in the handheld electronic device. A gasket (e.g., an o-ring formed from silicone or other compliant material, a polyester film gasket, etc.) may be placed between the underside of bezel 14 and the outermost surface of display 16. The gasket may help to relieve pressure from localized pressure points that might otherwise place stress on the glass or plastic cover of display 16. The gasket may also help to visually hide portions of the interior of device 10 and may help to prevent debris from entering device 10.

In addition to serving as a retaining structure for display 16, bezel 14 may serve as a rigid frame for device 10. In this capacity, bezel 14 may enhance the structural integrity of device 10. For example, bezel 14 may make device 10 more rigid along its length than would be possible if no bezel were used. Bezel 14 may also be used to improve the appearance of device 10. In configurations such as the one shown in FIG. 1 in which bezel 14 is formed around the periphery of a surface of device 10 (e.g., the periphery of the front face of device 10), bezel 14 may help to prevent damage to display 16 (e.g., by shielding display 16 from impact in the event that device 10 is dropped, etc.).

Display screen 16 (e.g., a touch screen) is merely one example of an input-output device that may be used with handheld electronic device 10. If desired, handheld electronic device 10 may have other input-output devices. For example, handheld electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 24 and 22 may, if desired, form microphone and speaker ports. Display screen 16 may be, for example, a liquid crystal display (LCD), an organic light-emitting diode (OLED) display, a plasma display, or multiple displays that use one or more different display technologies. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement. Bezels such as bezel 14 of FIG. 1 may be used to mount display 16 or any other device with a planar surface to housing 12 in any of these locations.

A user of handheld device 10 may supply input commands using user input interface devices such as button 19 and touch screen 16. Suitable user input interface devices for handheld electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of handheld electronic device 10 in the example of FIG. 1, buttons such as button 19 and other user input interface devices may generally be formed on any suitable portion of handheld electronic device 10. For example, a button such as button 19 or other user interface control may be formed on the side of handheld electronic device 10. Buttons and other user interface controls can also be located on the top face, rear face, or other portion of device 10. If desired, device 10 can be controlled remotely (e.g., using an infrared remote control, a radio-frequency remote control such as a Bluetooth remote control, etc.).

In some embodiments, the device 10 is a device where operation of a predefined set of functions on the device is performed exclusively through display screen 16 and/or button 19. By using a touch screen and/or a button as the primary input/control device for operation of the device 10, the number of physical input/control devices on the device 10 may be reduced.

The predefined set of functions that may be performed exclusively through display screen 16 and/or button 19 include navigation between user interfaces. In some embodiments, the display screen 16 and/or button 19, when touched by the user, navigates the device to a main, home, or root menu from any user interface that may be displayed on the device 10. In such embodiments, the display screen 16 and/or button 19 may be referred to as a "menu button".

Handheld device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device. Device 10 may also have audio and video jacks that allow device 10 to interface with external components. Typical ports include power jacks to recharge a battery within device 10 or to operate device 10 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of handheld electronic device 10 can be controlled using input interface devices such as touch screen display 16.

Components such as display 16 and other user input interface devices may cover most of the available surface area on the front face of device 10 (as shown in the example of FIG. 1) or may occupy only a small portion of the front face of device 10. Because electronic components such as display 16 often contain large amounts of metal (e.g., as radio-frequency shielding), the location of these components relative to the transceiver elements in device 10 should generally be taken into consideration. Suitably chosen locations for the transceiver elements and electronic components of the device will allow the transceivers of handheld electronic device 10 to function properly without being disrupted by the electronic components.

Figure 2:
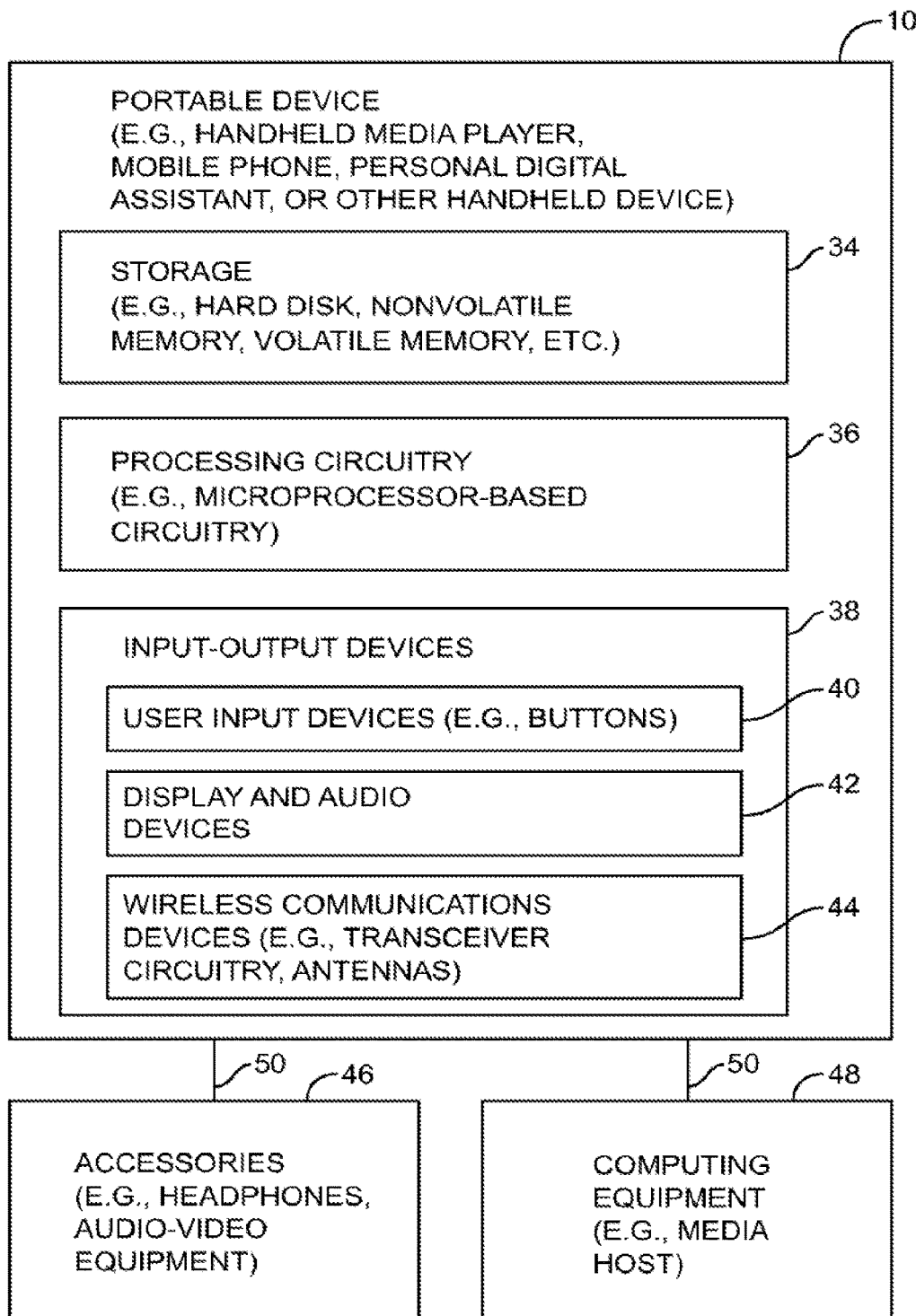
FIG. 2 is a schematic diagram of an illustrative handheld electronic device in accordance with an embodiment of the present invention.

A schematic diagram of an embodiment of an illustrative handheld electronic device is shown in FIG. 2. Handheld device 10 may be a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, telephone applications, voice-over-internet-protocol (VOIP) telephone call applications, email applications, media playback applications, operating system functions, video conferencing applications, instant messaging applications, blogging applications, photo management applications, digital camera applications, digital video camera applications, word processing applications, JAVA-enabled applications, encryption, digital rights management, voice recognition applications, voice replication applications, etc.

The various applications that may be executed on the device may use at least one common physical user-interface device, such as the touch screen (i.e., the touch sensitive display). One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as WiFi®), protocols for other short-range wireless communications links such as the Bluetooth® protocol, etc.).

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Display of display and audio devices 42 (e.g., display screen 16 of FIG. 1) may be a touch-sensitive display. The touch-sensitive display has a graphical user interface (GUI)

and is in communication with processing circuitry 36 and storage 34 containing one or more modules, programs or sets of instructions for performing multiple functions. In some embodiments, the functions may include telephoning, video conferencing, e-mailing, instant messaging, blogging, digital photographing, digital videoing, web browsing, digital music playing, and/or digital video playing. Instructions for performing these functions may be included in storage 34 for execution by processing circuitry 36.

In some embodiments, a user may interact with the GUI primarily through finger contacts and gestures on the touch-sensitive display. In those embodiments, the portable device 10 may be configured to detect one or more finger contacts with the touch screen display, apply one or more heuristics to the one or more finger contacts to determine a command for the portable device 10, and process the command. The one or more heuristics may comprise: a heuristic for determining that the one or more finger contacts correspond to a one-dimensional vertical screen scrolling command, a heuristic for determining that the one or more finger contacts corresponds to a two-dimensional screen translation command, and a heuristic for determining that the one or more finger contacts correspond to a command to transition from displaying a first item in a set of items to displaying a next item in the set of items.

The touch-sensitive display provides an input interface and an output interface between the device 10 and a user. A display controller receives and/or sends electrical signals to/from the touch screen. The touch screen displays visual output to the user. The visual output may include graphics, text, icons, video, and any combination thereof (collectively termed "graphics"). In some embodiments, some or all of the visual output may correspond to user-interface objects.

The touch-sensitive display (i.e., touch screen) has a touch-sensitive surface, sensor or set of sensors that accepts input from the user based on haptic and/or tactile contact. The touch screen and the display controller (along with any associated modules and/or sets of instructions in storage 34) detect contact (and any movement or breaking of the contact) on the touch screen and converts the detected contact into interaction with user-interface objects (e.g., one or more soft keys, icons, web pages or images) that re displayed on the touch screen. In an exemplary embodiment, a point of contact between the touch screen and the user corresponds to a finger of the user, as described herein. However, the user may make contact with the touch screen using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device 10 translates the rough finger-based input into a procise pointer/cursor position or command for performing the actions desired by the user.

The touch-sensitive display may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies, including but not limited to capacitive, resistive, infrared, and surface acoustic wave technologies, as well as other proximity sensor arrays or other elements for determining one or more points of contact with a touch screen.

Wireless communications devices 44 may include communications circuitry such as radio-frequency (RF) transceiver circuitry formed from one or more integrated circuits, power amplifier circuitry, passive RF components, one or more antennas, and other circuitry for handling RF wireless signals. Wireless signals can also be sent using light (e.g., using infrared communications).

The RF (radio frequency) transceiver circuitry receives and sends RF signals, also called electromagnetic signals. The RF circuitry converts electrical signals to/from electromagnetic signals and communicates with communications networks and other communications devices via the electromagnetic signals. The RF circuitry may include circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies.

Device 10 can communicate with external devices such as accessories 46 and computing equipment 48, as shown by paths 50. Paths 50 may include wired and wireless paths. Accessories 46 may include headphones (e.g., a wireless cellular headset or audio headphones) and audio-video equipment (e.g., wireless speakers, a game controller, or other equipment that receives and plays audio and video content).

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another handheld electronic device 10), or any other suitable computing equipment.

The transceivers and wireless communications devices of device 10 may support communications over any suitable wireless communications bands. For example, wireless communications devices 44 may be used to cover communications frequency bands such as the cellular telephone bands at 850 MHz, 900 MHz, 1800 MHz, and 1900 MHz, data service bands such as the 3G data communications band at 2170 MHz band (commonly referred to as UMTS or Universal Mobile Telecommunications System), the WiFi® (IEEE 802.11) bands at 2.4 GHz and 5.0 GHz, the Bluetooth® band at 2.4 GHz, and the global positioning system (GPS) band at 1550 MHz. These are merely illustrative communications bands over which devices 44 may operate. Additional local and remote communications bands are expected to be deployed in the future as new wireless services are made available. Wireless devices 44 may be configured to operate over any suitable band or bands to cover any existing or new services of interest. Device 10 may use one or multiple transceivers or transceiver components to provide wireless coverage over all communications bands of interest.

Figure 3:
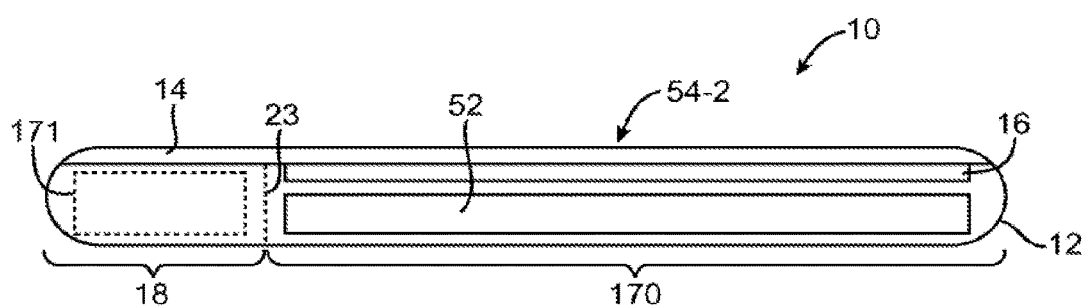
FIG. 3 is a cross-sectional view of an illustrative handheld electronic device in accordance with an embodiment of the present invention.

A somewhat schematic cross-sectional view of an illustrative handheld electronic device 10 in accordance with an embodiment of the present invention is shown in FIG. 3. As shown in FIG. 3, ground plane 54-2 may include bezel 14, display 16, housing 12, and other conductive components 52 in region 170 of device 10. Housing 12 in region 18 may be made up of a plastic cosmetic cap, which allows resonating elements to be placed in region 171. Bezel 14 may be used to mount display 16 to housing 12. Electrical components 52 such as printed circuit boards, flex circuits, integrated circuits, batteries, and other devices may be mounted within portion 170 of device 10. The conductive structures within portion 170 can be electrically connected to one another so that they serve as ground for the transceiver(s) in device 10. Bezel 14 can also be electrically connected to portion 170 (e.g., through welds, metal screws, metal clips, press-fit contact between adjacent metal parts, wires, etc.).

Figure 4:
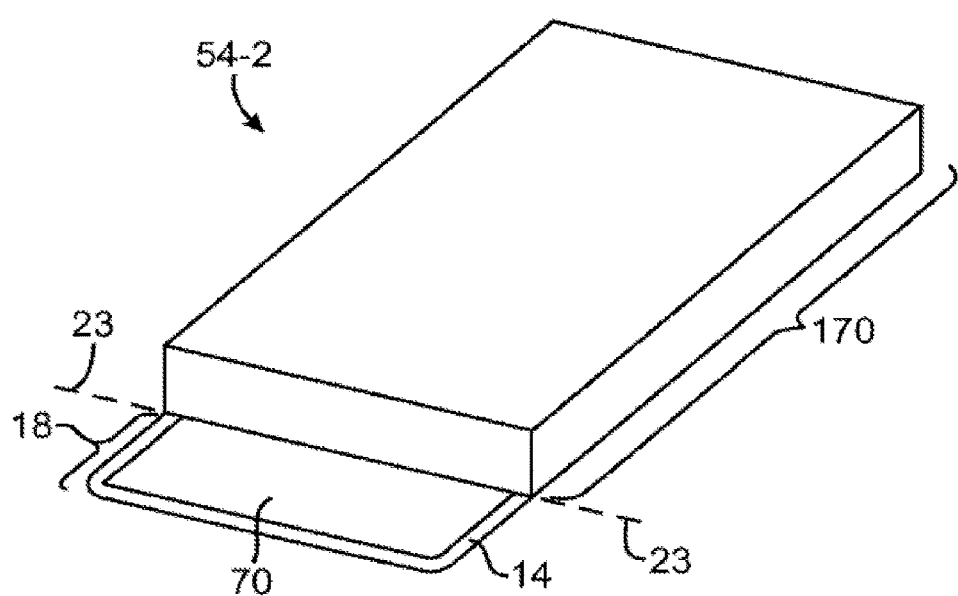
FIG. 4 is a somewhat simplified interior perspective view of an illustrative handheld electronic device with a conductive bezel in accordance with an embodiment of the present invention.

As a result of these electrical connections, bezel 14 and conductive portions of device 10 in region 170 form conductive ground plane 54-2, as shown in FIG. 4. The conductive portions of device 10 in region 170 may lie on one side of dotted line 23, whereas at least some of the conductive portions of bezel 14 may extend outwards from portions 170 and may lie on the other side of dotted line 23, thereby defining slot 70.

With one suitable configuration, slot 70 may have an area equal to the opening between bezel 14 and the conductive portions of device 10 that lie on the opposite side of dotted line 23. With other suitable configurations, one or more electrical components may overlap with the otherwise rectangular opening formed between bezel 14 and region 170 to form slot with smaller dimensions (rectangular or non-rectangular).

Figure 5:
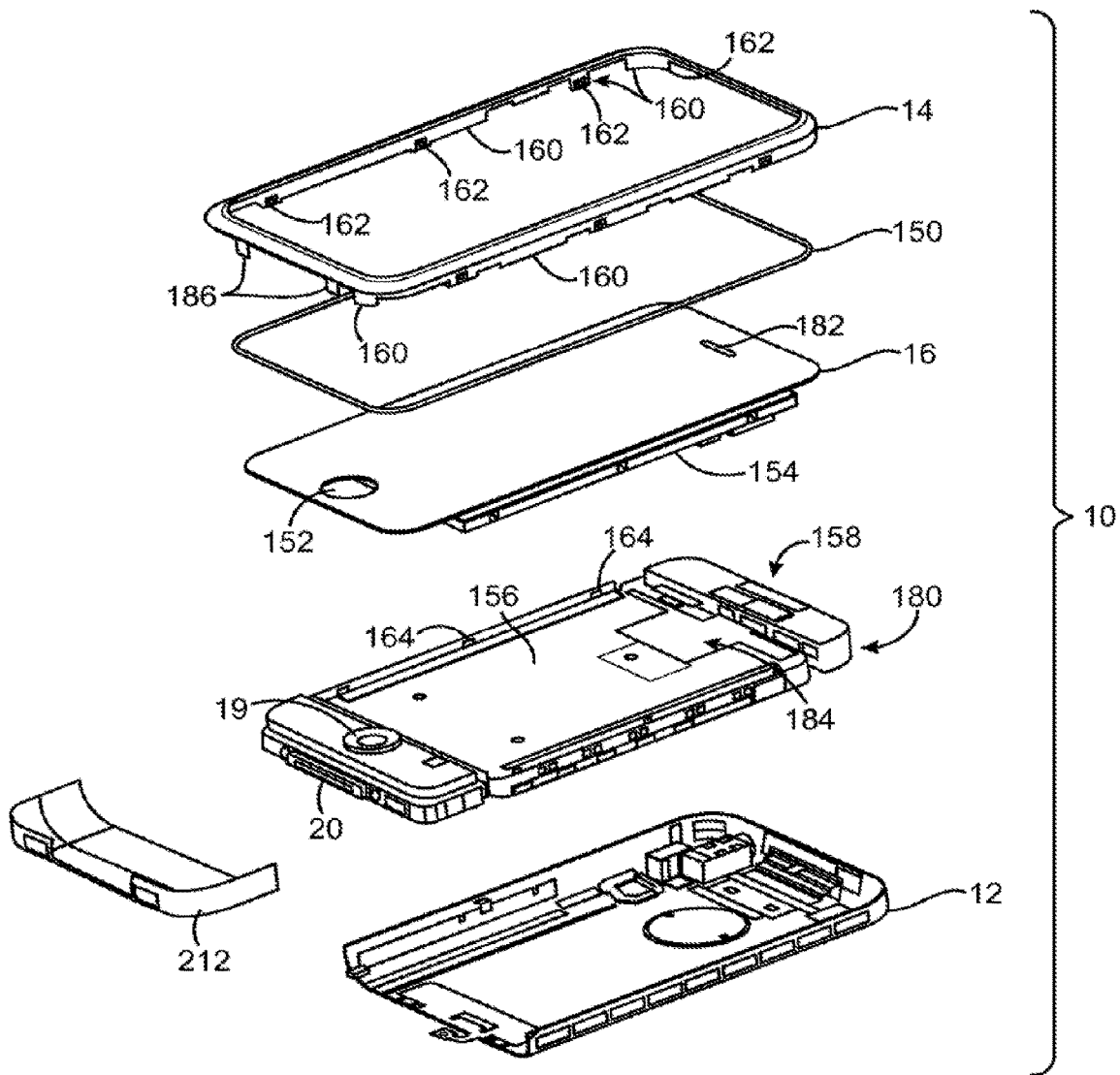
FIG. 5 is an exploded top perspective view of an illustrative handheld electronic device in accordance with an embodiment of the present invention.

An exploded perspective view of an illustrative handheld electronic device 10 in accordance with an embodiment of the present invention is shown in FIG. 5. As shown in FIG. 5, handheld electronic device 10 may have a conductive bezel such as conductive bezel 14 for securing display 16 or other such planar components to lower housing portion 12. A gasket such as gasket 150 may be interposed between bezel 14 and the exposed surface of display 16. Gasket 150 may be formed of silicone, polyester film, or other soft plastic (as an example). Gasket 150 may have any suitable cross-sectional shape. For example, gasket 150 may have a circular cross section (i.e., gasket 150 may be an o-ring having, for example, a 0.6 mm diameter), gasket 150 may have a rectangular cross-section, etc. Gasket 150 may help to seal the surface of display 16 to prevent debris from entering device 10, may help to center the display within bezel 14, and may help to hide potentially unsightly portions of display 16 from view. Display 16 may have one or more holes or cut-away portions. For example, display 16 may have hole 152 to accommodate button 19 and hole 182 to accommodate sound from a speaker.

If desired, display 16 may be touch sensitive. In touch sensitive arrangements, display 16 may have a touch sensor such as touch sensor 154 that is mounted below the uppermost surface of display screen 16 just above the liquid crystal display (LCD) element. Frame subassembly 180 may receive the display and touch sensor components associated with display 16. Transceiver structures may be housed behind cosmetic plastic cap 212. Cosmetic plastic cap 212 may also cover components such as a microphone and speaker. Additional components (e.g., an additional speaker, audio jacks, a SIM card tray, buttons such as a hold button, volume button, ringer select button, and camera module, etc.) may be housed in region 158 at the opposite end of device 10.

Bezel 14 may be secured using any suitable technique (e.g., with prongs that mate with holes in a spring fastened to housing 12, with fasteners, with snaps, with adhesive, using welding techniques, using a combination of these approaches, etc.). As shown in FIG. 5, bezel 14 may have portions 160 that extend downwards. Portions 160 may take the form of prongs, rails, and other protruding features. Portions 160 may be configured so that the outer perimeter of portions 160 mates with structures along the inner perimeter of housing 12 when frame subassembly 180 is mounted in housing 12 and when bezel 14 is used to attach display 16 to device 10.

Portions 160 may have screw holes 162 through which screws may mate with corresponding threaded standoffs when attaching bezel 14 to housing subassembly 180. The screws and other conductive structures (e.g., welds, wires, springs, brackets, etc.) may be used to electrically connect bezel 14 to grounded elements within device 10. For ease of assembly, frame subassembly 180 may have tabs, snaps, or other attachment structures. For example, frame subassembly 180 may have holes 164 that receive mating fingers on display 16. Prongs (ears) 186 may receive screws that are used in securing and grounding bezel 14 to dock connector 20.

Frame subassembly 180 may include a frame that is based on a thin (e.g., 0.3 mm) stainless steel layer onto which plastic features have been overmolded and attached (e.g., with a heat staking process) or other suitable structural components. Frame top 156 may be recessed within frame subassembly 180 to accommodate the touch sensor and other portions 154 of display 16. Sensors such as an ambient light sensor and a proximity sensor may be mounted in region 184.

Figure 6:
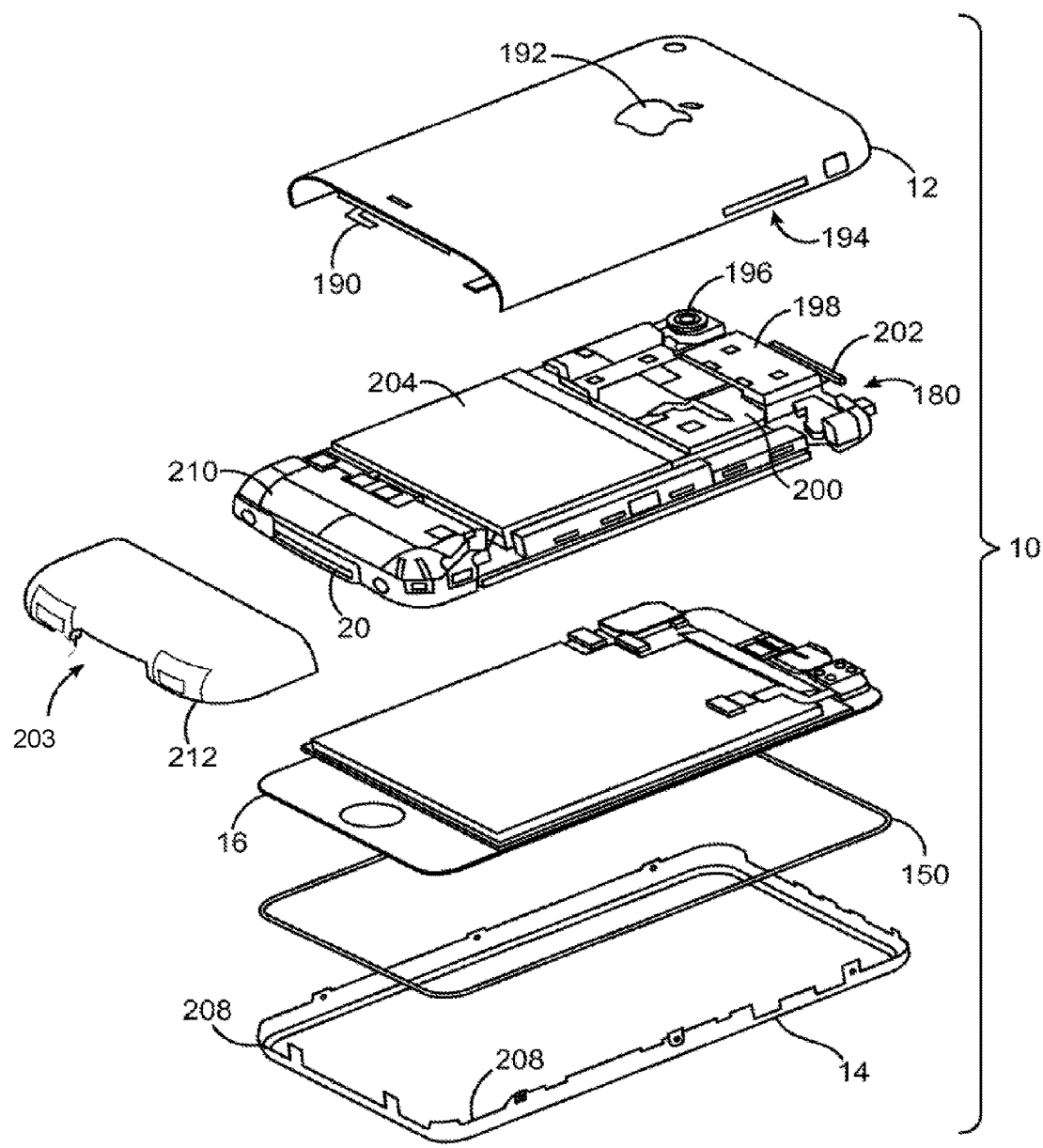
FIG. 6 is an exploded bottom perspective view of an illustrative handheld electronic device in accordance with an embodiment of the present invention.

An exploded perspective rear view of the illustrative device of FIG. 5 is shown in FIG. 6. As shown in FIG. 6, housing 12 may have ground tab 190. Tab 190 may be used to help ground resonating element 54-1A to conductive housing 12. To ensure that tab 190 makes good electrical contact to housing 12, anodized portions of housing 12 may be removed using laser etching.

Logo 192 may be formed of a metal such as stainless steel (as an example). Logo 192 may be attached to housing 12 using adhesive or other suitable attachment mechanisms. Buttons such as a volume button, hold button, and ringer mode select button may be located in region 194.

Camera module 196 may be attached to frame subassembly 180. Transceivers may also be attached to frame subassembly 180. As shown in FIG. 6, transceiver 52B may be housed in conductive can 198 and transceiver 52A may be housed in conductive can 200. Cans such as cans 198 and 200 serve as radio-frequency shielding enclosures that reduce electromagnetic interference (EMI). SIM tray 202 on frame subassembly 180 may be used to receive SIM cards.

Cosmetic cap 212 may have a recess such as recess 203 that accommodates dock connector 20 when cap 212 is attached to device 10. Cap 212 may have inwardly protruding snap keys (plastic beams) that are guided through holes in the frame during assembly and that snap into bezel 14, thereby preventing cap 212 from becoming detached from device 10 during use. Bezel 14 may have rails 208 that guide cosmetic cap 212 during assembly and that help to retain cap 212 on device 10.

Resonating elements such as resonating elements 54-1A and 54-1B may be formed from conductive traces on flex circuit 210. Flex circuit 210 may be mounted on a plastic cap (as an example).

Figure 7:
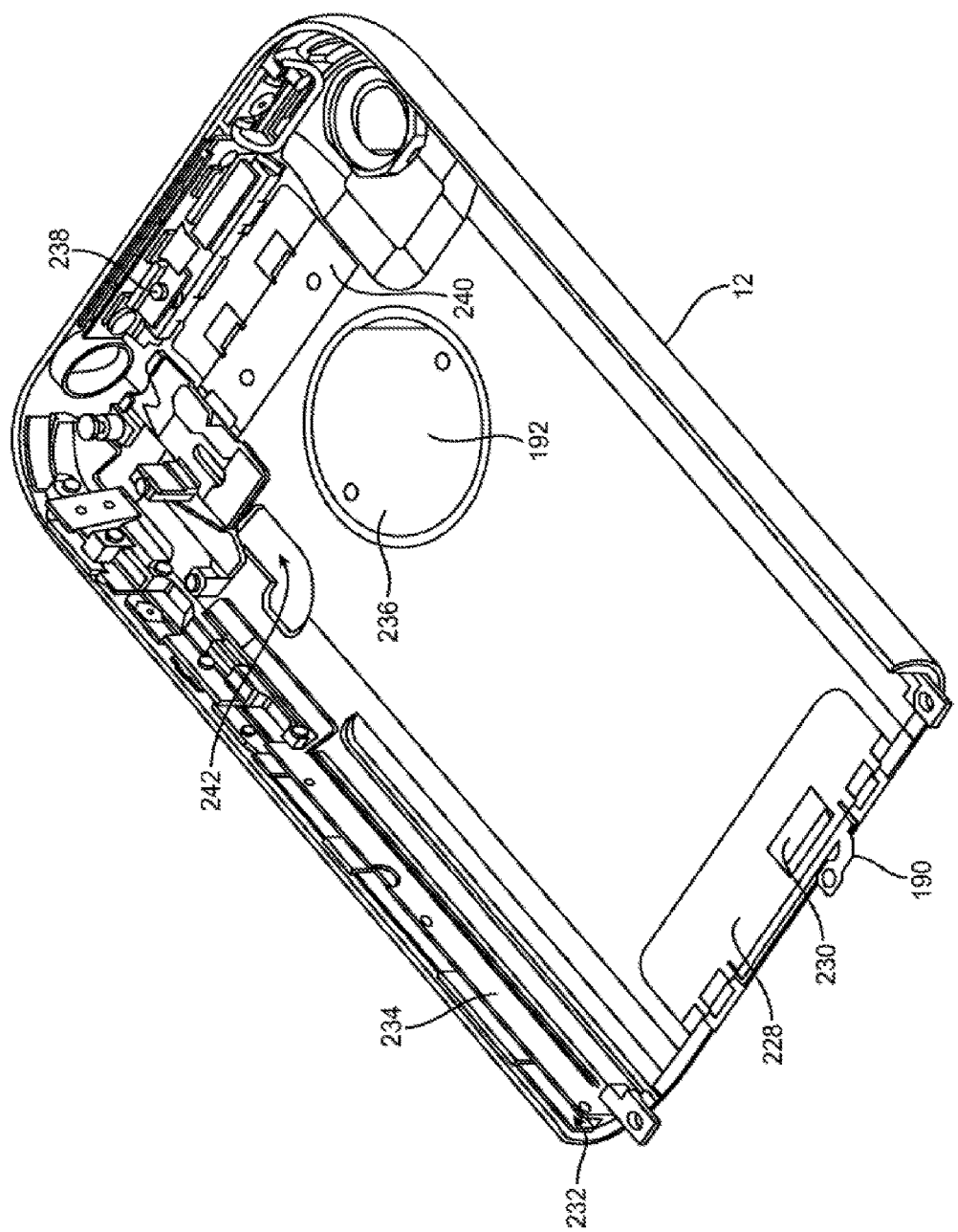
FIG. 7 is a perspective interior view of an illustrative rear housing portion in accordance with an embodiment of the present invention.

An interior perspective view of a conductive housing portion 12 is shown in FIG. 7. As shown in FIG. 7, ground tab 190 may be part of a ground bracket 228. Ground bracket 228 may have a tab under region 230 that slides into a mating channel in housing 12. The anodized surface of housing 12 in this region may be stripped using laser etching, thereby allowing the tab in region 230 to make good electrical contact between bracket 228 (and its tab 190) and housing 12.

Metal strips such as housing bracket 234, which are sometimes referred to as rails, may be formed of cast magnesium and may be attached to housing 12 using adhesive (as an example). For example, a rubbery glue may be used to attached strips such as housing bracket 234 to housing 12. Metal strips such as housing bracket 234 may be spaced apart from the sidewalls of housing 12 to form channels such as channel 232. A spring in each channel may have holes that engage mating hooks on bezel 14.

Bracket 242 may be used to hold an audio jack, vibrator, and a button wire flex circuit. Bracket 242 may be formed from a metal such as cast magnesium.

Top ground bracket 240 may have fingers that engage housing 12. The anodized surface of housing 12 may be removed by laser etching in the finger contact region to ensure that ground bracket 240 makes good electrical contact to housing 12. Ground plane components in device 10 that are placed on top of ground bracket 240 may make contact to housing 12 through ground bracket 240.

Logo 192 may be shorted to housing 12 to ensure that logo 192 does not electrically float relative to housing 12. Laser etching may be used to remove a portion of the anodized surface of housing 12 under region 236 to ensure a good electrical contact between logo 192 and housing 12. Logo 192 may be adhesively bonded to housing 12. In one embodiment, logo 192 may be bonded to housing 12 using a thermal bonding agent and an epoxy resin bonding agent.

Pin 238 may serve as a pivot for a SIM card ejection tray arm.

Figure 8:
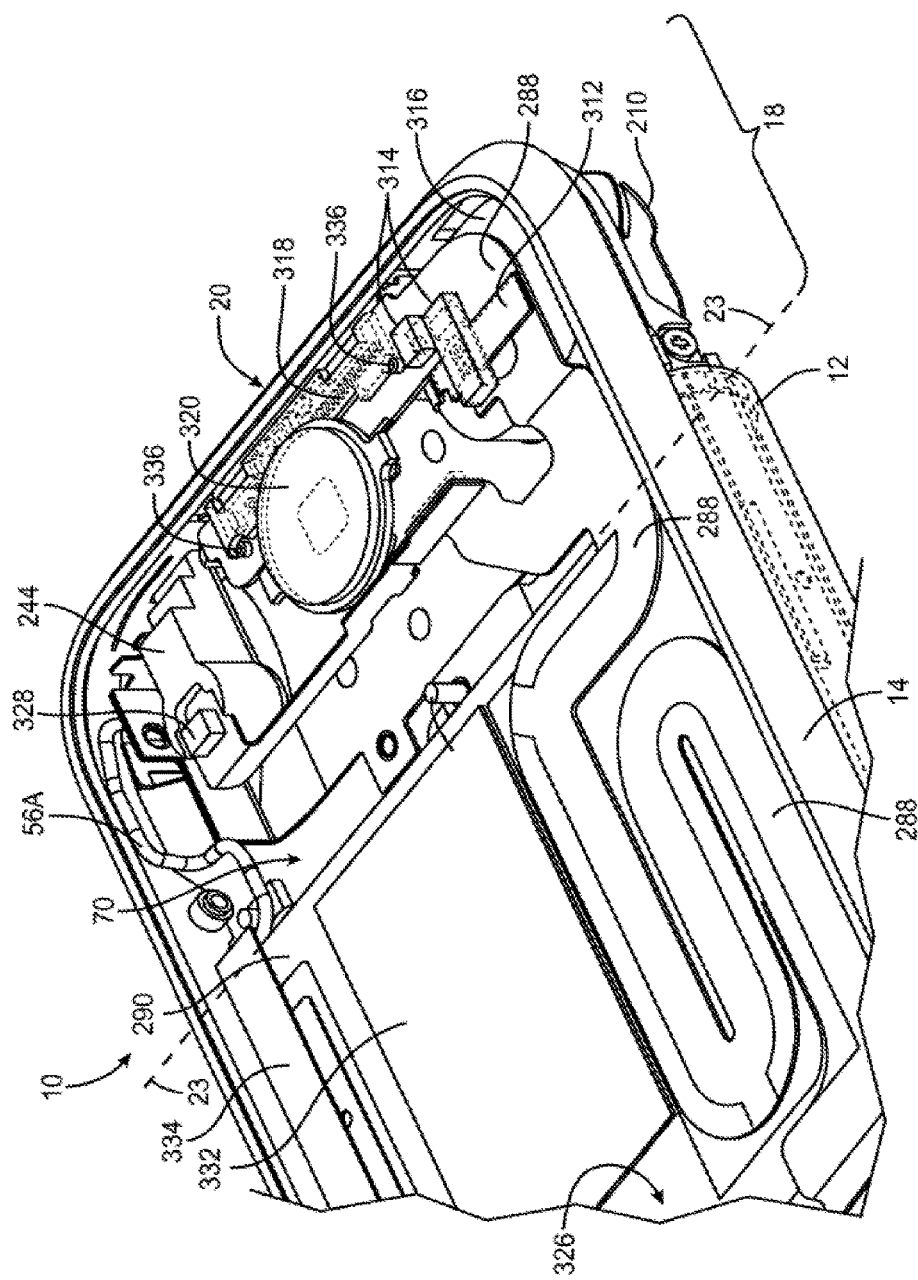
FIG. 8 is a perspective view of a portion of the interior of an illustrative handheld electronic device showing how a flex circuit may be used to route connector signals around the edge of the handheld electronic device and showing the location of components such as a microphone, menu button, and speaker module in accordance with an embodiment of the present invention.

A perspective top view of device 10 with internal structures (such as display 16) removed is shown in FIG. 8. As shown in FIG. 8, flex circuit 288 may be used to form a bus that conveys signals from dock connector 20 to processing circuitry located towards end 326 of device 10. The overall shape of slot 70 is formed by the boundaries of bezel 14 and frame 290 (which lies along dotted line 23). This overall shape can be influenced by electrical components that lie within its boundaries. Certain components, such as microphone 244 and speaker 316 may be isolated from the transceiver using inductors (as an example). Other components (e.g., button 320) may be isolated from the transceiver using inductors or resistors (as an example). Isolating components in this way can eliminate or substantially reduce any impact these components might have on the effective area of slot 70.

Dock connector 20 may contain metal that overlaps the otherwise rectangular shape of slot 70. Moreover, flex circuit 288 contains signal traces and ground traces. The conductive material in these traces acts as a portion of the ground plane of device 10 and therefore can alter the effective shape of slot 70. As shown in the illustrative arrangement of FIG. 8, flex circuit 288 may be routed around the edge of slot 70 immediately adjacent to bezel 14.

Speaker flex circuit 312 may be used to route signals from flex circuit 288 to speaker module 316. Speaker flex circuit 312 may be connected to flex circuit bus 288 by soldering (as an example). Components 314 may include isolation inductors and other electrical components for supporting the operation of speaker module 316. Electrical components 318 may be used to support the operation of dock connector 20.

Stiffener 322 may be used to support flex circuit 288 as flex circuit 288 passes towards microphone 244 and button 320. A flex circuit extension (i.e., a tail of flex circuit 288) in the vicinity of region 324 may be used to connect the leads of menu button 320 to flex circuit 288. Menu button 320 may be a dome switch or any other suitable user interface control. Components 330 may be formed using inductors (e.g., traditional wire-wrapped inductors or ferrite chip inductors) or resistors. Components 330 may be used to help isolate button 320 from the transceivers of device 10 (e.g., to prevent button 320 from significantly influencing the shape of slot 70). Electrical components 328 may include inductors for isolating microphone 244 from the transceivers of device 10.

Pressure sensitive adhesive 332 may be used to mount battery 204. Foam 334 may help to prevent damage to display 16. Alignment posts 336 on dock connector 20 may be used to help align flex circuit 288.

Figure 9:
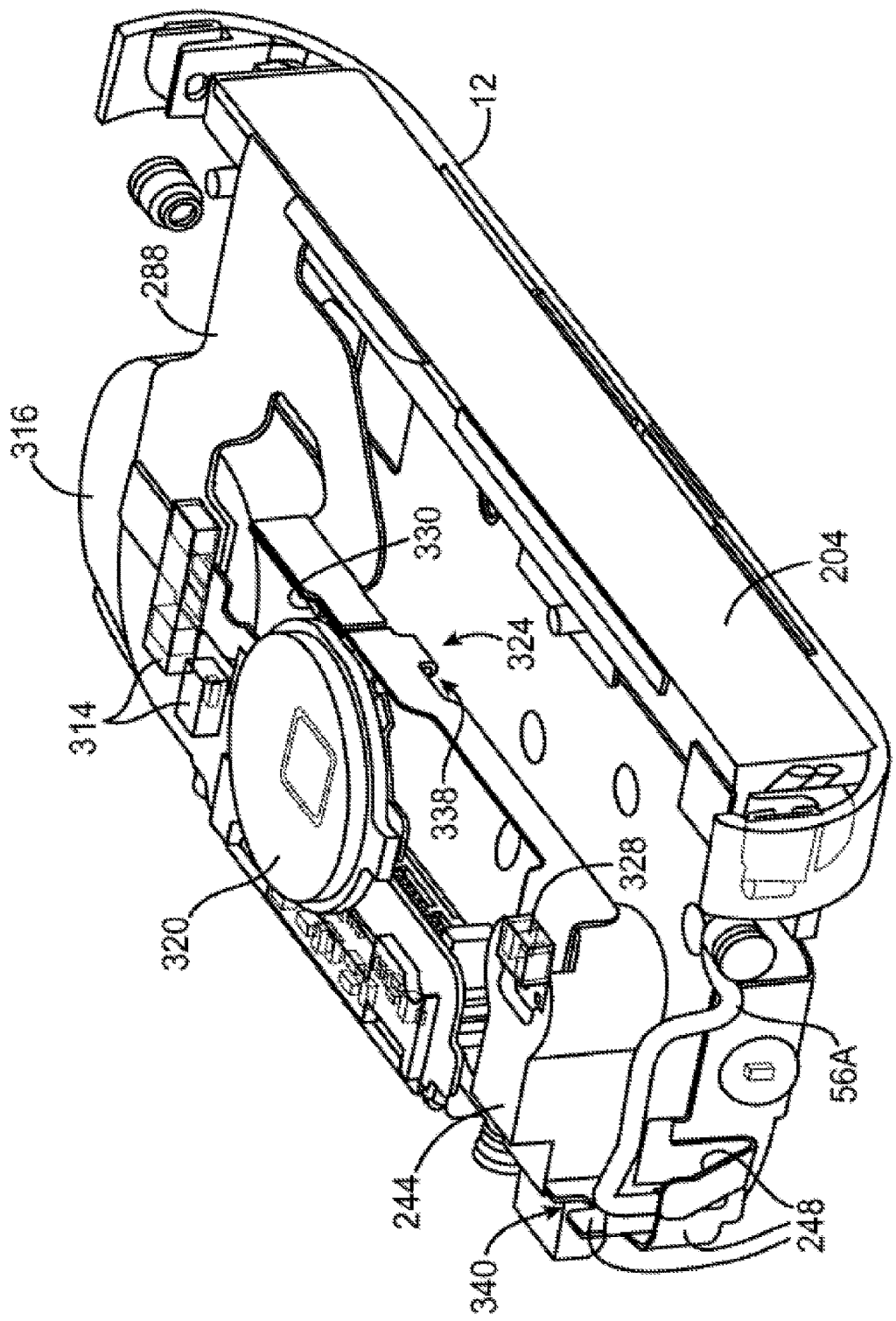
FIG. 9 is a partially sectional perspective view of a portion of the interior of an illustrative handheld electronic device showing the location of a grounding bracket that may be used to make contact between flex circuit traces and a bezel on the handheld electronic device in accordance with an embodiment of the present invention.

As shown in FIG. 9, extension 338 of flex circuit 288 may be used to make electrical connections between flex circuit 288 and button 320. Ground bracket 248 may have an indentation such as indentation 340 that mates with a rib on frame 290.

Figure 10:
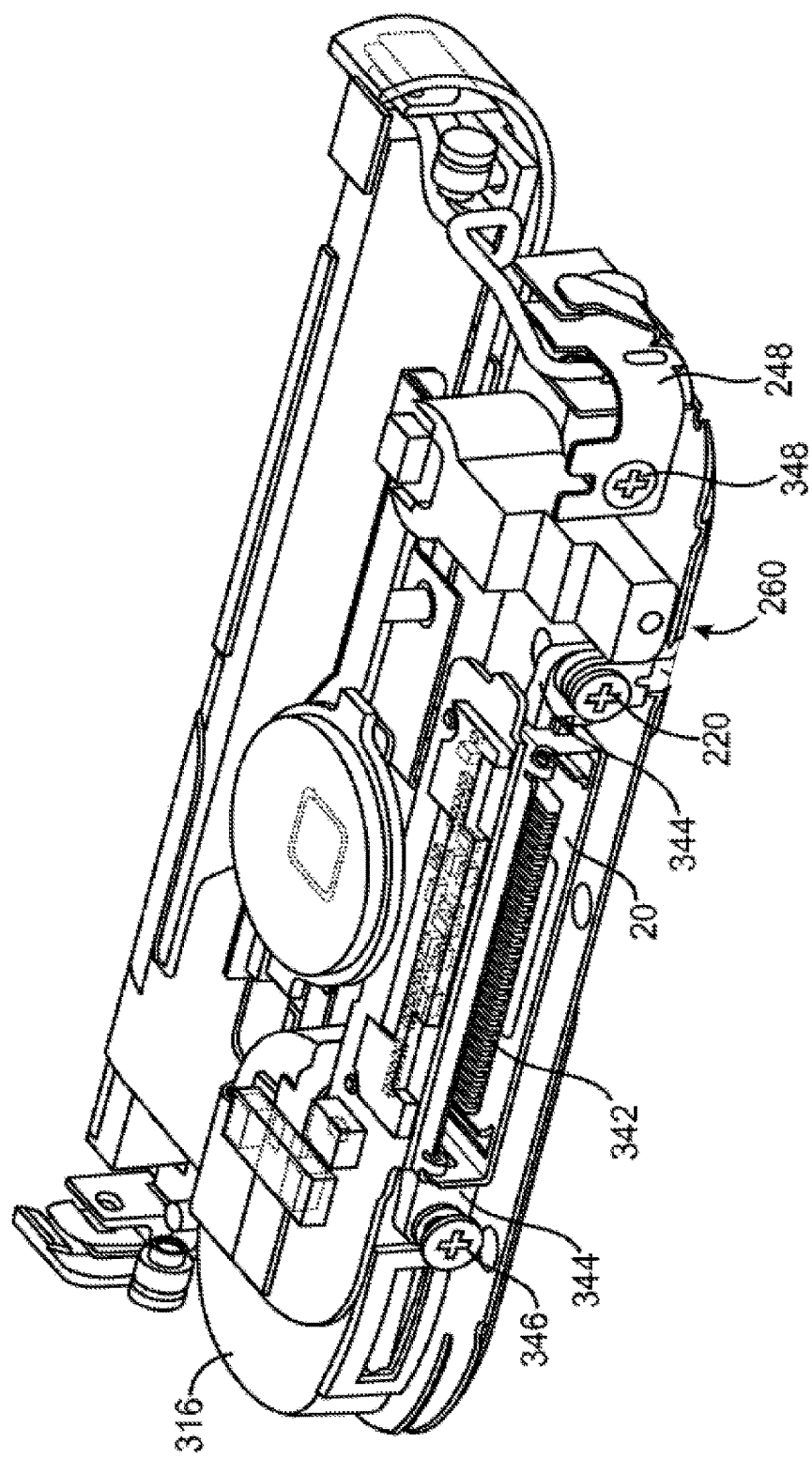
FIG. 10 is a perspective view of an end portion of an illustrative handheld electronic device showing the location of components such as a dock connector and menu button in the handheld electronic device in accordance with an embodiment of the present invention.

FIG. 10 shows how dock connector 20 may have 30 pins 342 (as an example). A flange formed from metal mounting tabs 344 may be welded to the main body of dock connector 20. Screws 220 and 346 may be screwed into threads on metal mounting tabs 344 through holes in tabs 186 (FIG. 5) of bezel 14. Screw 348 may be screwed into frame 290 to secure grounding bracket 248 to the frame. Screws such as screw 348 may be screwed into portions of frame 290 that are added to frame 290 after the plastic overmolded portion of frame 290 has been formed. These added portions of frame 290 may, for example, be added using a heat staking process.

Figure 11:
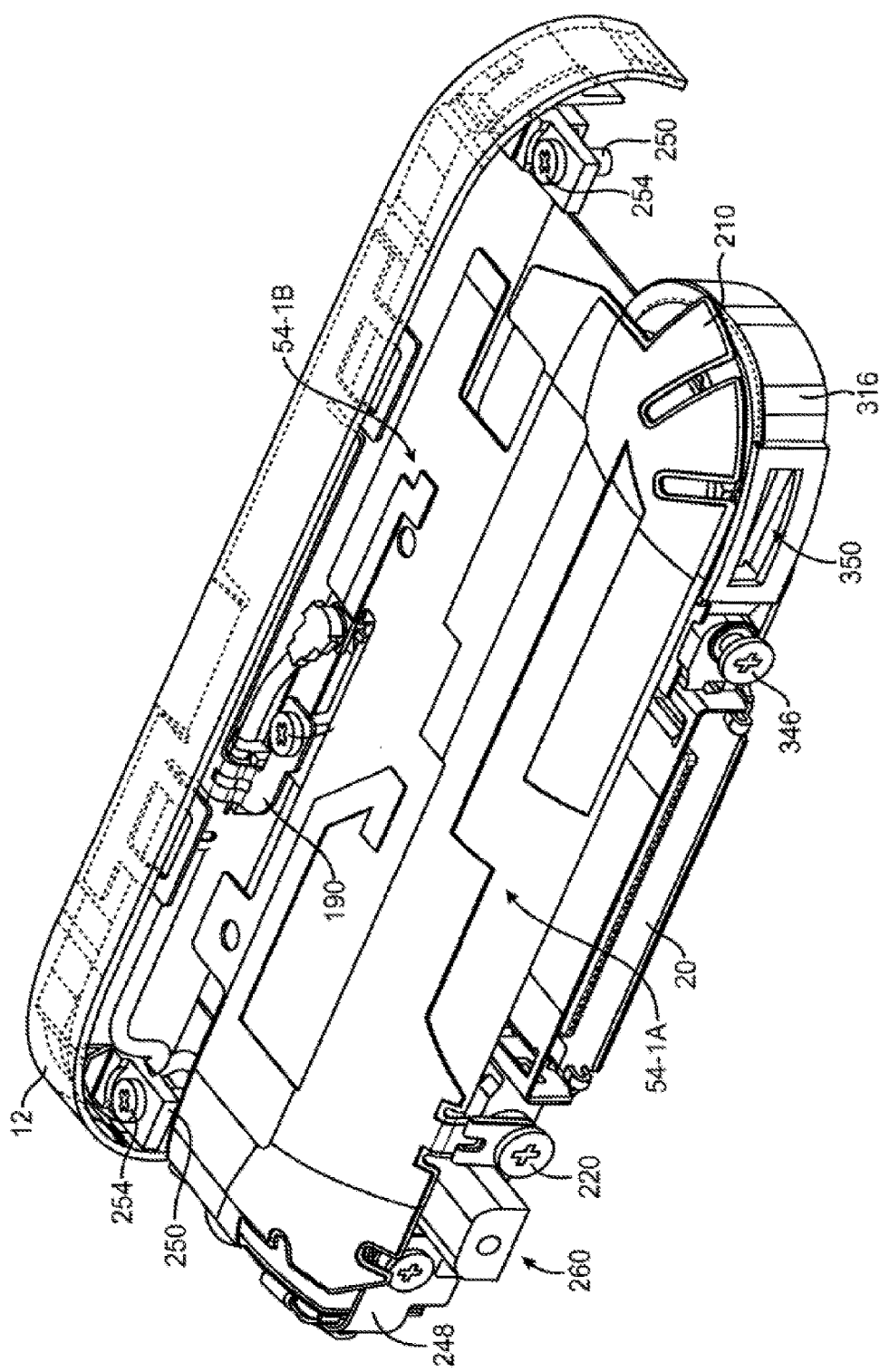
FIG. 11 is a perspective view of a portion of the interior of an illustrative handheld electronic device showing an illustrative flex circuit configuration in accordance with an embodiment of the present invention.

As shown in FIG. 11, speaker 316 may have an associated port 350, through which sound may emanate during device operation. In the rear view of FIG. 11, speaker port 350 is located on the right side of housing 12 and microphone port 260 is located on the left size of housing 12. This is merely illustrative. Speaker port 350 and microphone port 260 may be located on any suitable portion of housing 12 (e.g., front face, rear face, top side, bottom side, left side, or right side). As shown in FIG. 11, screws 254 may hold housing brackets 250 to the frame. The view of FIG. 11 does not include cap 102, so components such as speaker module 316 are visible beneath flex circuit 210.

Figure 12:
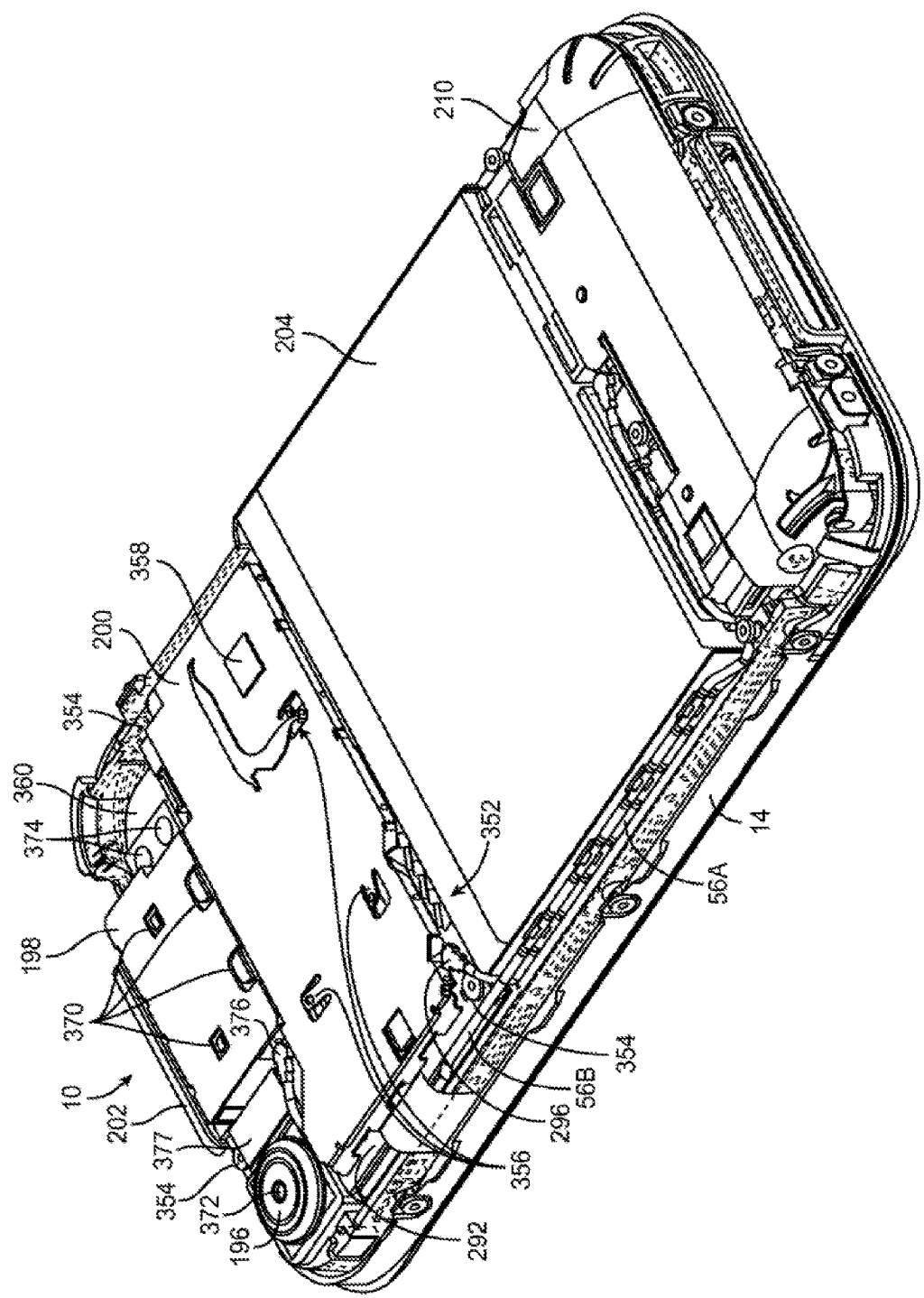
FIGS. 12 and 13 are perspective bottom views of the interior of an illustrative handheld electronic device in accordance with an embodiment of the present invention.

A perspective view of the interior of device 10 is shown in FIG. 12. Battery leads 352 may be used to convey power from battery 204 to the electronics of device 10. Leads 352 may be soldered to printed circuit boards such as printed circuit board 292. There may be any suitable number of leads 352 (e.g., ground, positive, and negative). Screws 354 may be used to screw circuit boards such as circuit board 292 to the frame of device 10.

Radio-frequency shielding (sometimes called EMI shielding) may be provided in the form of conductive cans 200 and 198. Shielding cans 200 and 198 (which are sometimes referred to as EMI enclosures, radio-frequency enclosures, or shielding housings) may be constructed from metal or other suitable conductive materials. Can 200 may be used to shield one transceiver, whereas can 198 may be used to shield another transceiver.

Coaxial cable 56B may be connected to the transceiver in can 198 using coaxial cable connector 376. Coaxial cable 56A may be connected to the transceiver in can 200 using coaxial cable connector 296.

A conductive foam pad such as pad 358 may be affixed to the top of can 200 to help ground can 200. When the cover of the housing of device 10 is installed, conductive foam 358 may rub against an exposed portion of the interior of the housing, thereby electrically shorting can 200 to the housing. Can 200 may also have bent up fingers 356 that rub against the housing to short can 200 to the housing. Bent up fingers 370 on can 198 may be used to short can 198 to the housing.

To ensure that fingers such as fingers 370 and 356 make good electrical contact with the housing, the portions of the housing that contact the fingers may be processed to remove any nonconductive coatings. For example, if the housing is an anodized aluminum housing that has a nonconductive anodized coating, the anodized layer may be removed by laser etching in the regions of the housing that contact fingers 370 and 356 and the regions of the housing that contact other shorting structures such as conductive foam 358. Cans 198 and 200 may be used to shield one or more layers of printed circuit board (e.g., multiple stacked printed circuit boards). These circuit boards may be used to mount integrated circuits and/or discrete components.

Camera module 196 may have a lens 372. Lens 372 may be a fixed focal length lens (as an example). Camera module 196 may be used to acquire still images and video images (e.g., video containing audio). Camera flex circuit 377 may be used to electrically connect camera module 196 to the printed circuit boards of device 10.

Recess 360 may be configured to receive components such as an audio jack and other input-output components. Holes 374 may be formed in the touch screen module of display 16 to reduce weight.

Figure 13:
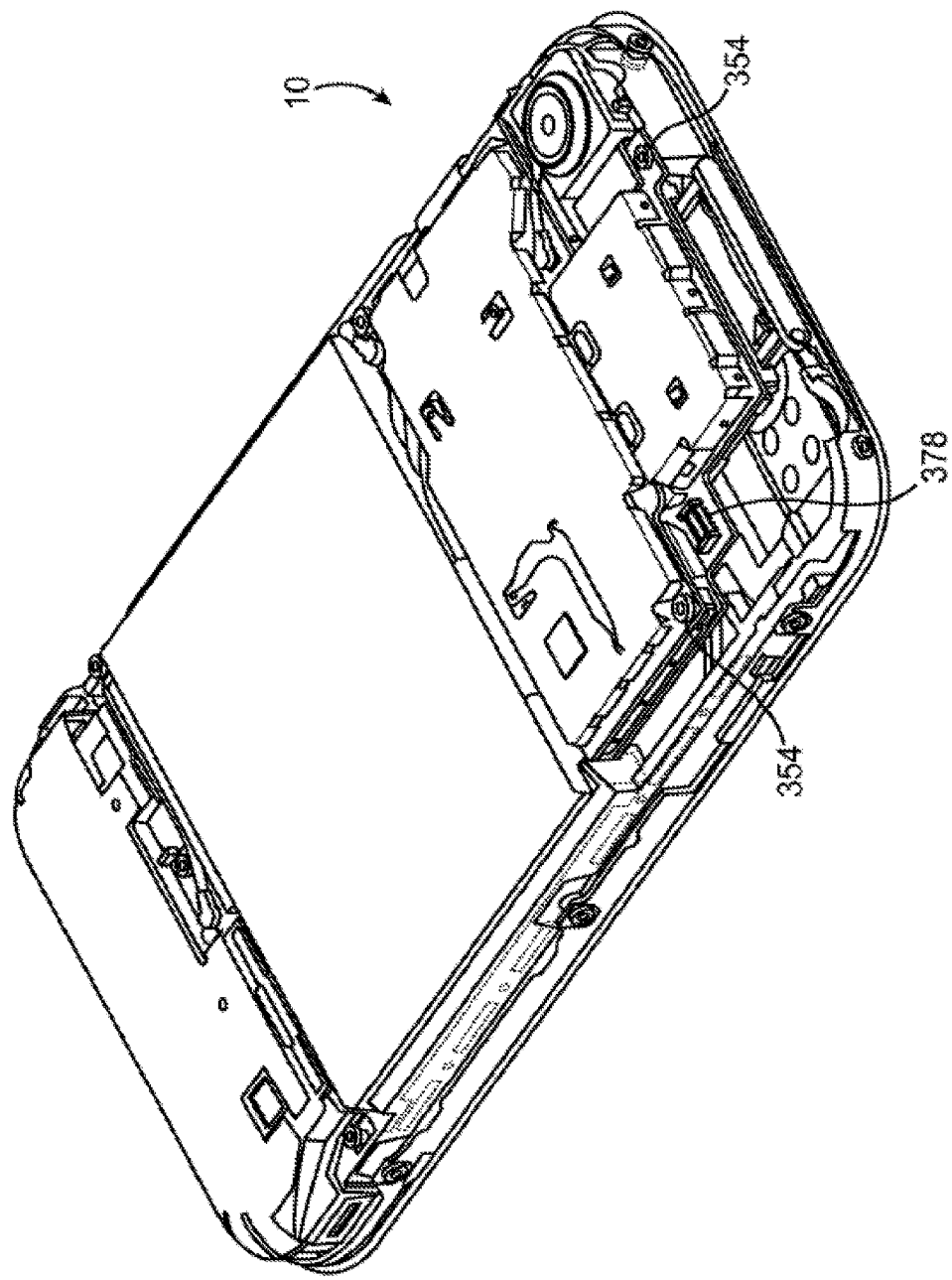

As shown in FIG. 13, device 10 may use a connector such as connector 378 to receive a flex circuit plug. The flex circuit plug and its associated flex circuit may be used to convey electrical signals to the circuitry of device 10 from components such as an audio jack, volume button, hold button, and ringer select button.

Figure 14:
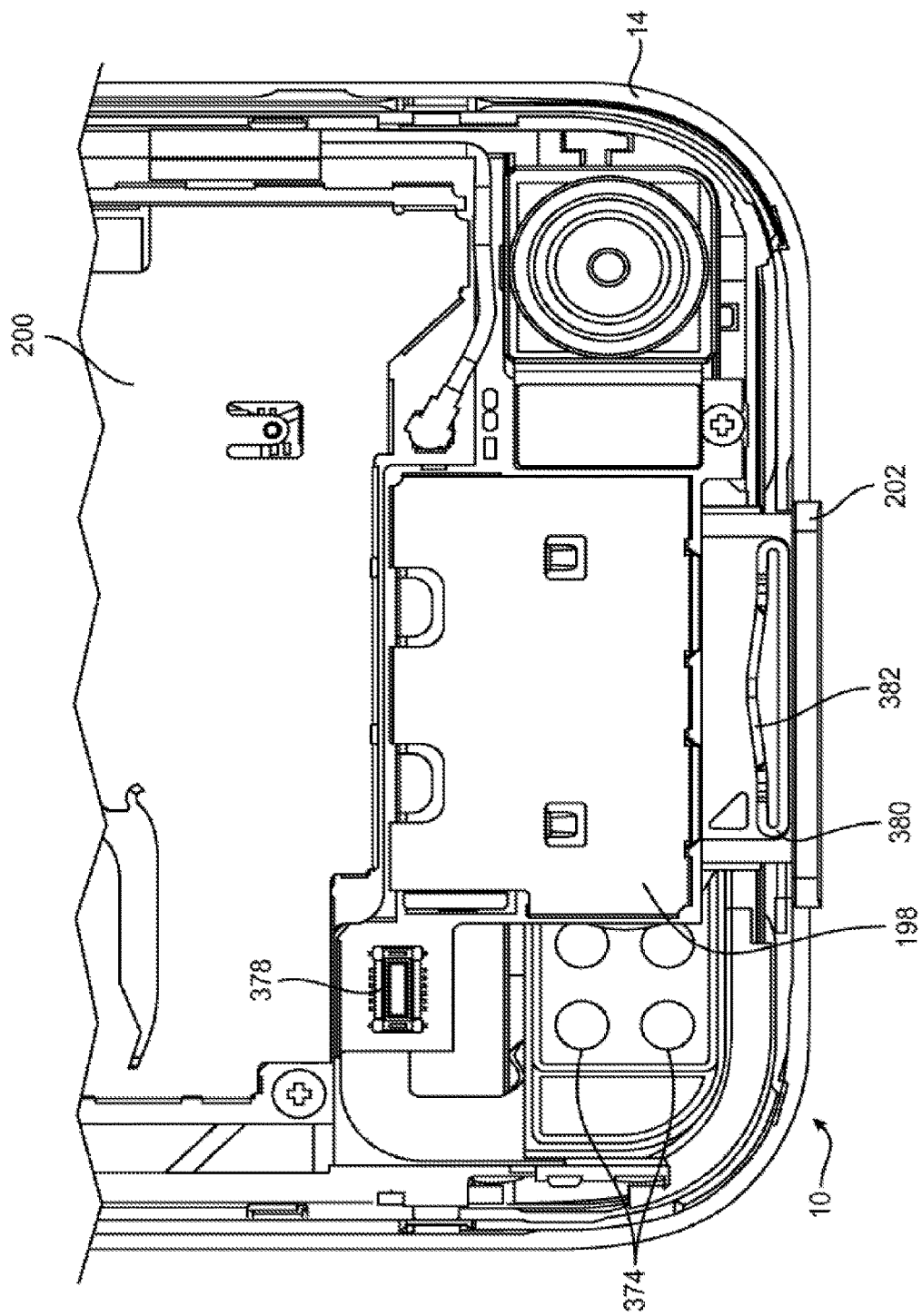
FIG. 14 is a rear view of an upper interior portion of an illustrative handheld electronic device in accordance with an embodiment of the present invention.

As shown in FIG. 14, SIM card tray 202 may have a spring 380. Spring 380 may have a bent portion 382. When compressed, bent portion 382 can press upwards (in the orientation of FIG. 14) against a SIM card to hold the SIM card in place in tray 202.

Figure 15:
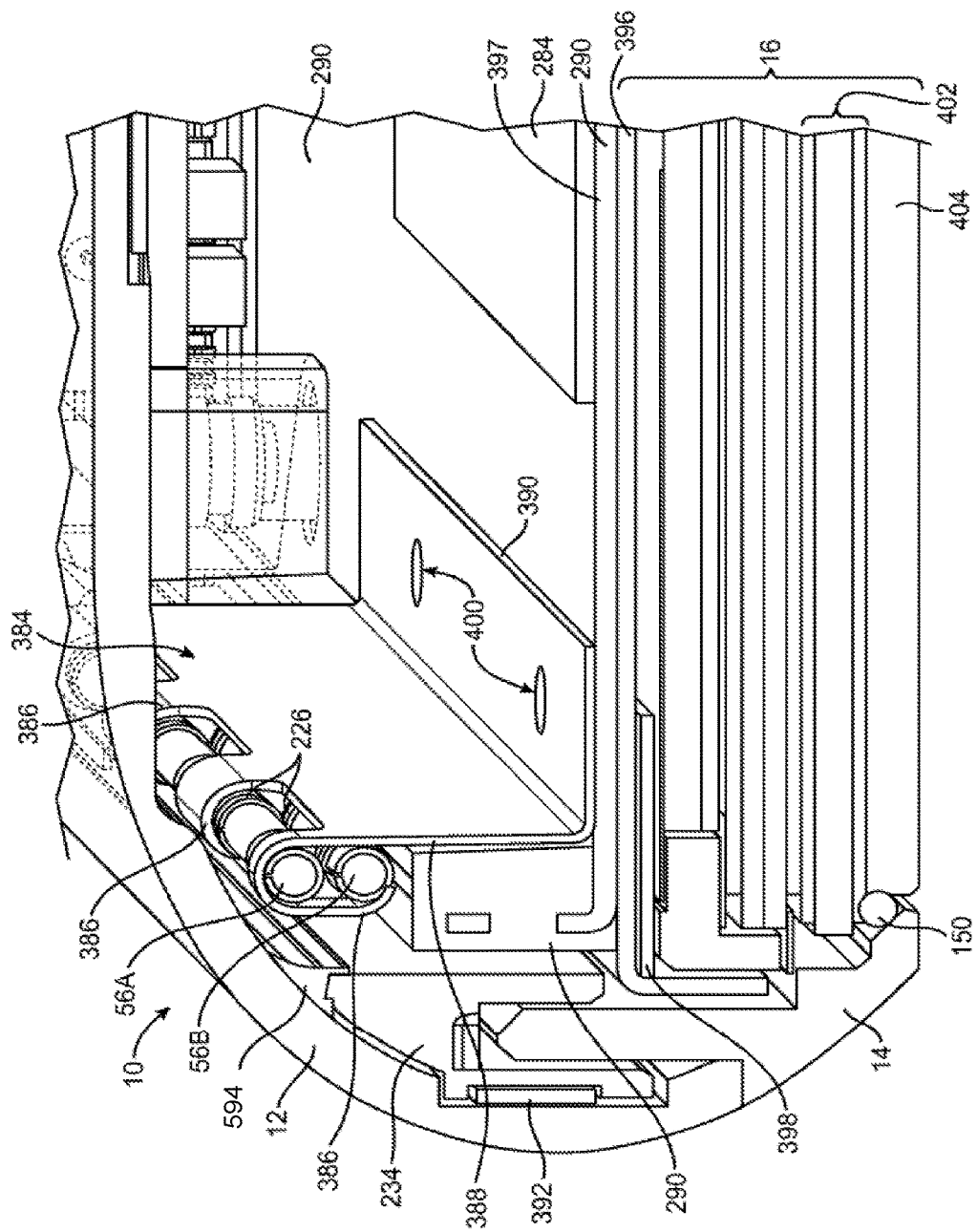
FIG. 15 is a cross-sectional view of an interior portion of an illustrative handheld electronic device showing how a spring may be used to help electrically connect a housing frame to a housing in accordance with an embodiment of the present invention.

A cross-sectional view of housing 12 is shown in FIG. 15. As shown in FIG. 15, a conductive member such as J-clip 384 may be used to secure coaxial cables 56A and 56B. J-clip 384 may be electrically connected to conductive portions of frame 290 (e.g., exposed metal portions), thereby shorting ferrules 226 (and thus the outer braid conductor of coaxial cables 56A and 56B) to frame 290 and the other portions of ground plane 54-2. Adhesive 284 may be used to mount battery 204 to frame 290.

J-clip 384 may have a generally horizontal planar base member such as base member 390 and a generally vertical planar member such as vertical planar member 388. J-clip base 390 may be welded to the metal of frame 290 or may otherwise be electrically and mechanically connected to frame 290. Base 390 may have alignment holes 400. During assembly, an assembly tool with mating protrusions may engage holes 400 and hold J-clip 384 in place for welding.

J-clip 384 may have bendable extensions such as clip extensions 386. Extensions 386 may be manually crimped in place over coaxial cables 56A and 56B during assembly. If desired, extensions 386 may, at a later time, be bent backwards to release coaxial cables 56A and 56B. This releasable fastening arrangement allows for rework. For example, cables 56A and 56B can be replaced. The ability to remove cables 56A and 56B from device 10 may also be advantageous when disassembling device 10 (e.g., when recycling all or part of device 10). Extensions 386 may have any suitable shape. For example, extensions 386 may be provided in the form of relatively narrow fingers that are easy to crimp and uncrimp. Alternatively, extensions 386 may be provided in the form of relatively wider tabs. Wide tab shapes may make good electrical contact with ferrules 226, but may be harder to crimp and uncrimp than narrower extension structures.

Spring 392 may be formed from metal or other suitable springy conductive material. Spring 392 may be glued or otherwise mounted in a channel between the side wall of housing 12 and housing bracket 234. During assembly, fingers on bezel 14 engage holes on spring clip 392, thereby securing bezel 14 to housing 12.

Housing bracket 234 may be glued or otherwise affixed to housing 12. Allowable excess glue 594 is shown above bracket 234. The housing bracket that is shown in FIG. 15 is sometimes referred to as the left housing bracket of device 10. Device 10 may also have a corresponding right housing bracket.

Display 16 may be mounted to housing 12 using bezel 14 and gasket 150. Display 16 may have a planar glass element such as glass element 404 and a touch sensitive element such as touch sensitive element 402. Frame 290 may have a conductive element such as sheet metal plate 396. Sheet metal plate 396 may be electrically and mechanically connected to sheet metal plate 397 (e.g., by welding, by gluing, by using fasteners, etc.). Foam 398 may be used to help protect display 16 from shock (e.g., in the event that device 10 is dropped).

Figure 16:
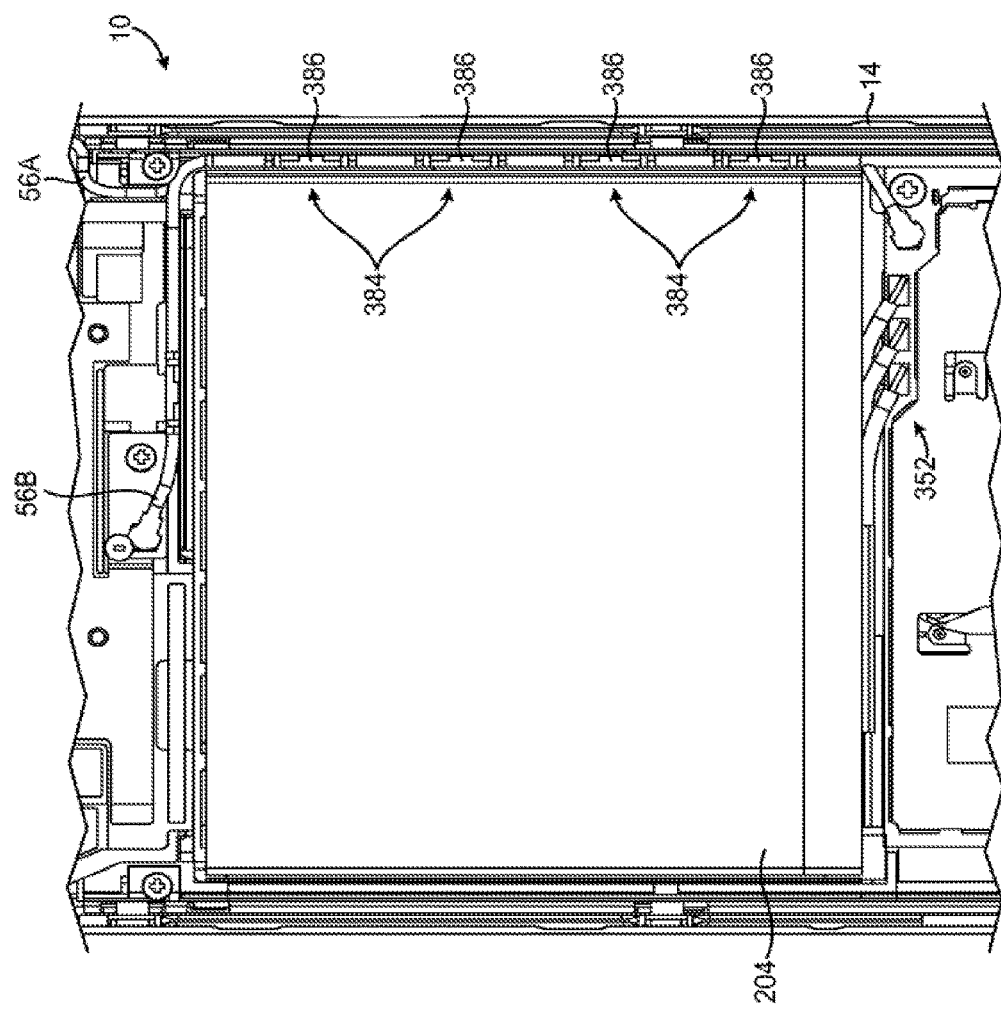
FIG. 16 is a rear view of a middle interior portion of an illustrative handheld electronic device in accordance with an embodiment of the present invention.

A top view of device 10 in the vicinity of J-clip 384 is shown in FIG. 16. As shown in the FIG. 16 example, extensions 386 may be used to crimp coaxial cables 56A and 56B at various segments along their lengths. In the example of FIG. 16, there are four sets of extensions 386 of substantially equal size that are spaced equally along edge 406 of device 12. If desired, the segments of cables that are electrically connected to extensions 386 may be of different sizes or there may be a different number of extensions 386. For example, there may be more than four extensions 386, there may be two larger extensions 386 and two smaller extensions 386, etc. There may also be only a single extension 386 along edge 406, although arrangements with more than one extension are generally easier to uncrimp when desired for rework or recycling and are therefore generally preferred.

Figure 17:
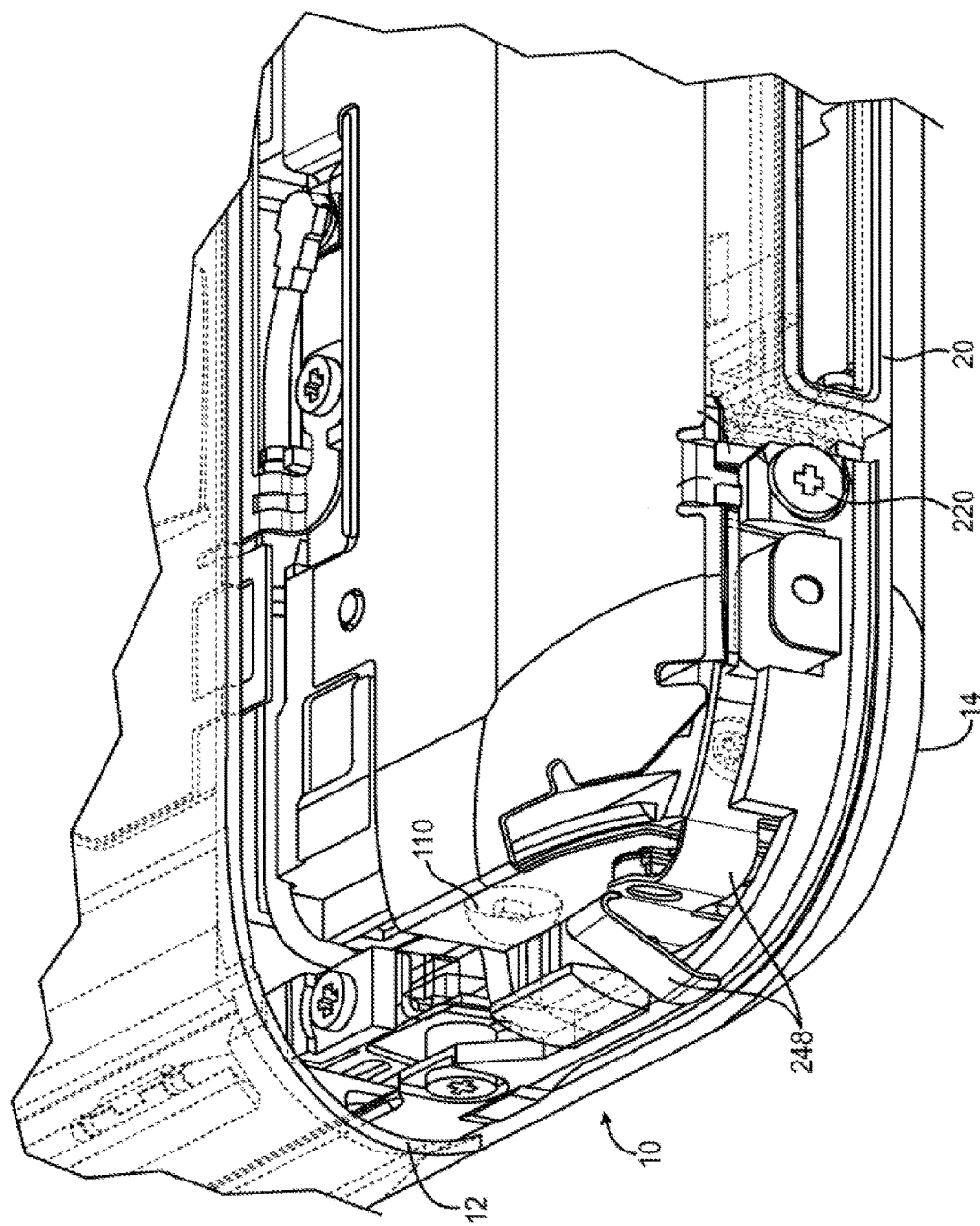
FIG. 17 is a perspective view of an end portion of an illustrative handheld electronic device in accordance with an embodiment of the present invention.

As shown in FIG. 17, grounding bracket 248 may be used to short the ground connector portion of coaxial cable connector 110 to bezel 14.

Figure 18:
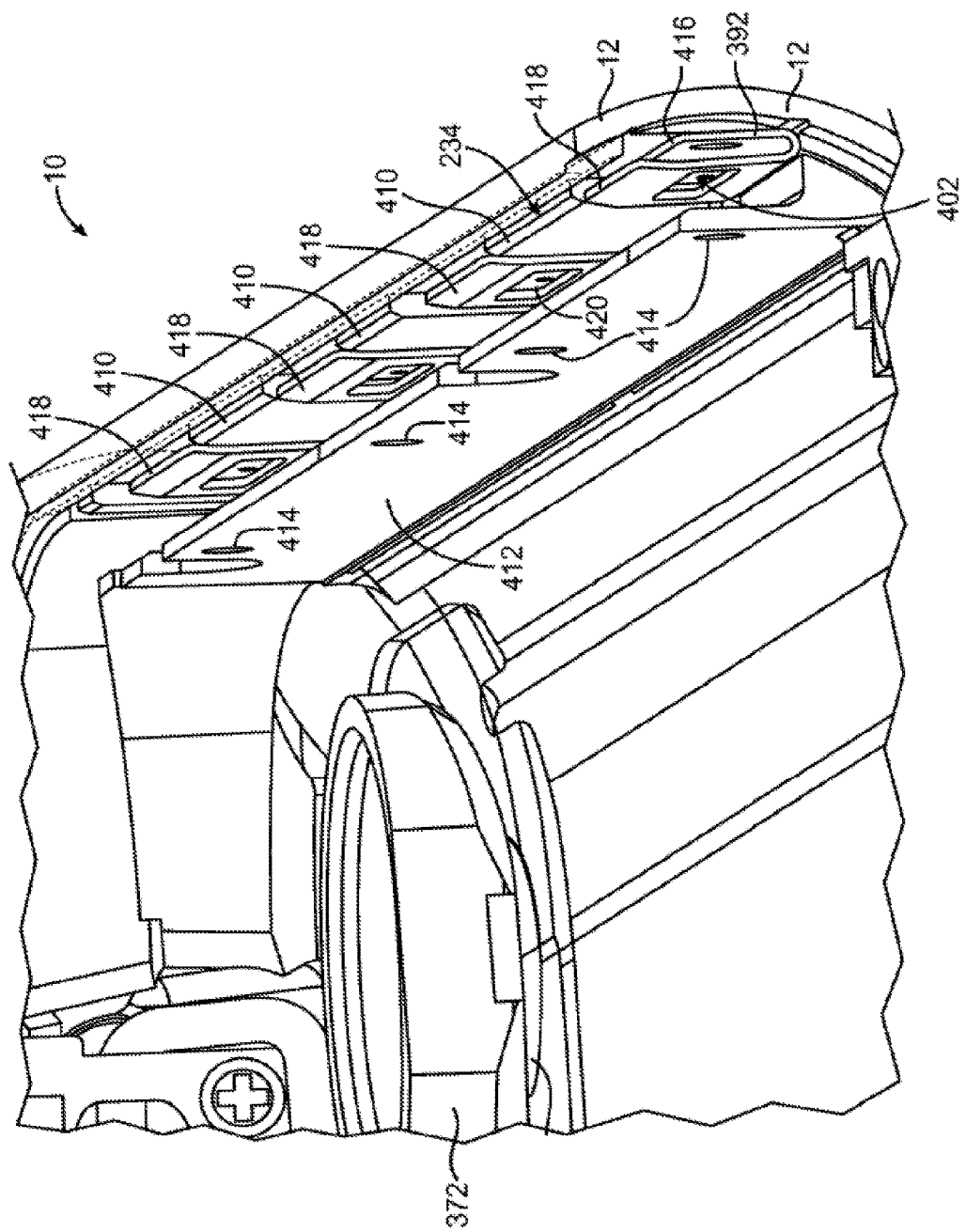
FIG. 18 is a cross-sectional view of an interior portion of an illustrative handheld electronic device in accordance with an embodiment of the present invention.

FIG. 18 shows a partially cross-sectional interior view of device 10. As shown in FIG. 18, bracket 234 may have a long, relatively uninterrupted rail portion such as rail 412 and, at intervals, may have extending fingers 410. Spring 392 may have a relatively uninterrupted rail portion 416 (mostly hidden from view in FIG. 18) and, at intervals, may have extending fingers 418. Fingers 410 of bracket 234 and fingers 418 of spring 392 may be interleaved as shown in FIG. 18. Bracket 234 may have holes 414 in rail 412. During manufacturing, an assembly tool may hold bracket 234 by engaging holes 414 with mating prongs. Spring 392 may have holes such as rectangular holes 420. Bezel 14 may have mating prongs. During assembly, the mating prongs from bezel 14 may slide into rectangular holes 420 to secure bezel 14 in place relative to housing 12 of device 10.

Figure 19:
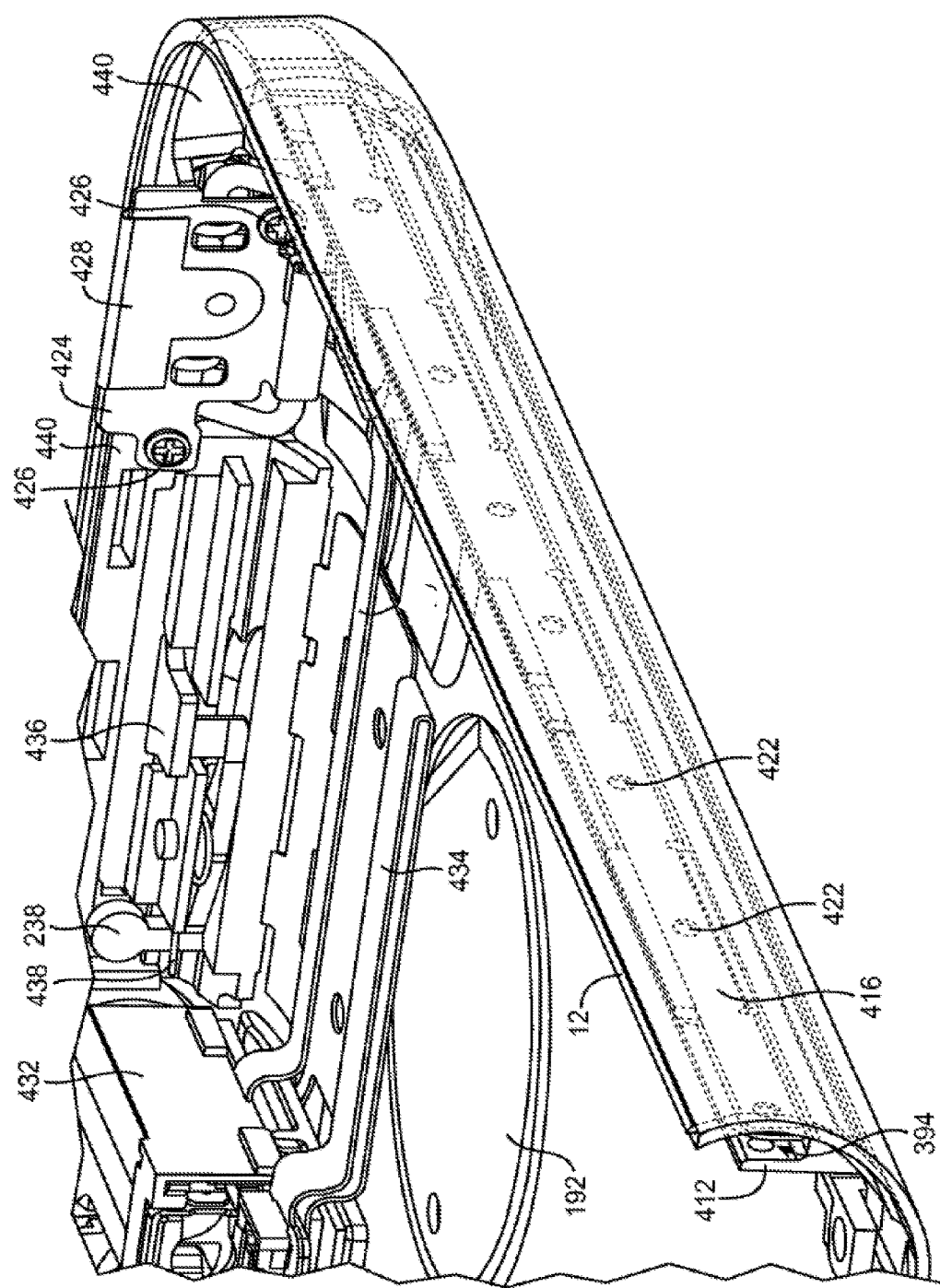
FIG. 19 is a partially cross-sectional perspective view of a middle interior portion of an illustrative handheld electronic device in accordance with an embodiment of the present invention.

As shown in FIG. 19, rail 416 of spring 394 may have alignment holes 422. During manufacturing, an assembly tool may hold spring 394 using prongs that mate with holes 422.

A bracket such as top bracket 440 (e.g., a bracket formed of a conductive material such as magnesium or aluminum) may be attached to housing 12 at the top of device 10 (e.g., using screws, glue, etc.). A bracket such as sheet metal bracket 424 may be attached to top bracket 440 using screws such as screws 426. A flex circuit for a hold button or other suitable button may be attached to bracket 424. A protective film such as a polyester protective film may cover the flex circuit to prevent damage. Flex circuit 434 may be used to route signals to circuitry 432 from a hold button mounted to bracket 428 (as an example). Circuitry 432 to which flex circuit 434 is routed may include jack 378 (FIG. 13).

SIM card ejector arm 436 may swing about pivot 238. Spring 438 may bias SIM card ejector arm 436, so that arm 436 may be used to eject a SIM card from device 10. Flex circuit 434 may make contact with overlapping printed circuit boards (not shown in FIG. 19).

Figure 20:
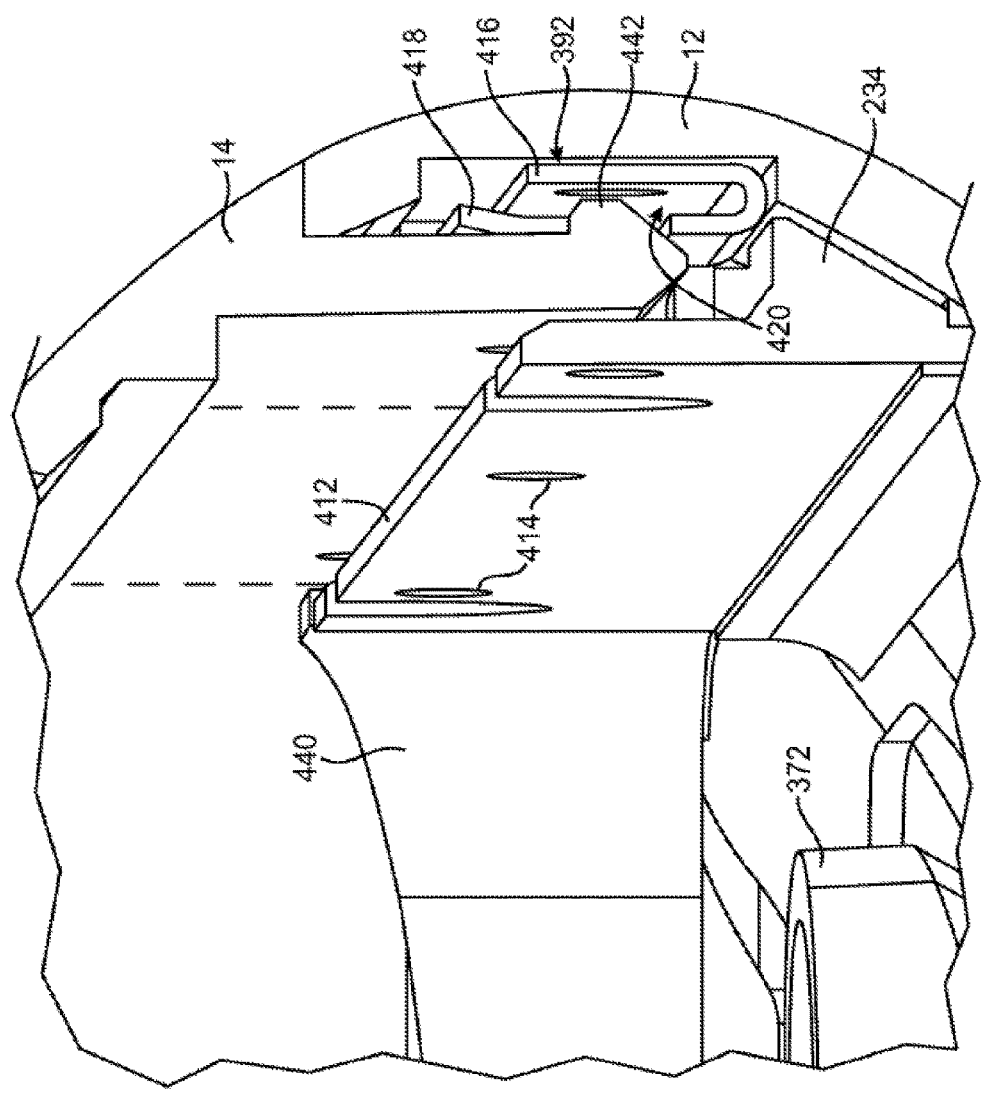
FIG. 20 is a cross-sectional view of a portion of a housing and a bezel in an illustrative handheld electronic device in accordance with an embodiment of the present invention.

A detailed cross-sectional view of bezel 14 in the vicinity of spring 392 is shown in FIG. 20. As shown in FIG. 20, bezel 14 may have extended members such as prongs 442 that mate with corresponding rectangular holes 420 in fingers 418 of spring 392. Spring 392 may be mounted between housing 12 and bracket 234, so when bezel prongs 442 protrude into spring 392, bezel 14 is held into place.

As described in connection with FIG. 4, a handheld electronic device with a conductive bezel may define a slot 70 that is roughly rectangular in shape (as an example). In a device such as the illustrative handheld electronic device described in connection with the figures, components that contain conductive elements may overlap with the rectangular slot that is formed by bezel 14 and the conductive portion of housing 12 and frame 290. These overlapping components may alter the shape of slot 70.

Figure 21:
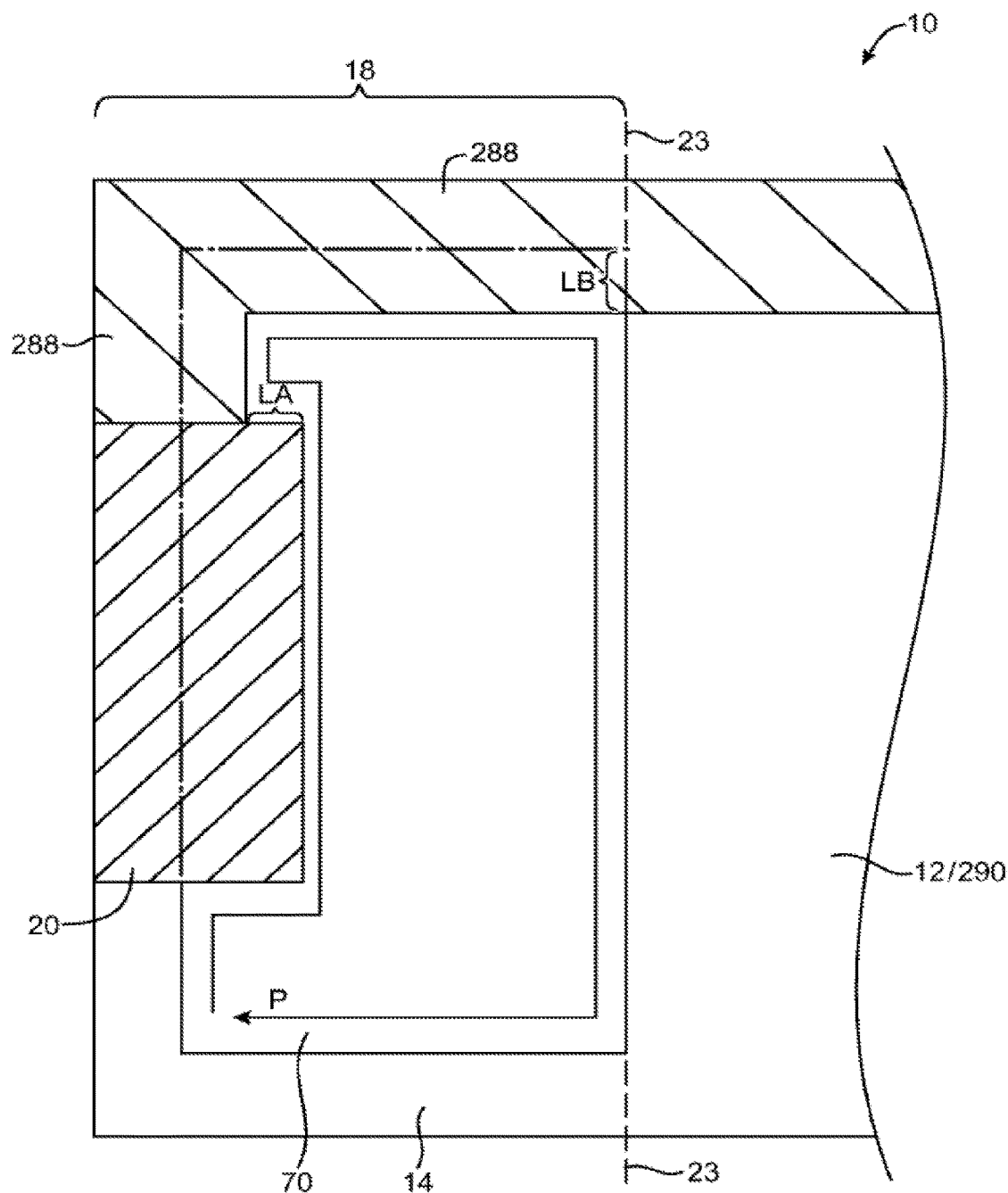
FIG. 21 is a top view of a slot with overlapping electrical components in an illustrative handheld electronic device in accordance with an embodiment of the present invention.

As shown in FIG. 21, for example, in region 18 of device 10, slot 70 may have a roughly rectangular shape arising from the rectangular opening defined by bezel 14 (to the left of dotted line 23 in FIG. 21) and housing/frame 12/290 (to the right of dotted line 23). Dock connector 20, which may be formed of a conductive material such as metal (e.g., stainless steel), may be grounded to bezel 14. As a result, dock connector 20 may form part of the ground plane 54-2 for device 10. In the example of FIG. 21, dock connector 20 protrudes into the otherwise rectangular opening of slot 70, thereby altering its rectangular shape. In particular, dock connector 20 adds a length of 2LA to the interior perimeter of slot 70. Flex bus connector 288 also contains conductive elements (e.g., copper ground and signal traces). Flex connector 288 therefore also alters the shape of slot 70, resulting in a shortening of the length of perimeter P of 2LB.

There may be a peak resonance associated with slot 70. The position of the peak resonance may be determined by the length of perimeter P. In general, the peak resonance of the slot portion of the transceiver of device 10 is located where the radio-frequency signal wavelength is equal to the length of perimeter P. In device 10, the perimeter P of slot 70 may be determined by the size of the rectangular opening formed by bezel 14 and frame/housing 12/290 and by the modifications to this rectangular opening that arise from the presence of connector 20 and flex circuit 288. If desired, the locations and shapes of dock connector 20 and flex circuit 288 may be selected so that the perimeter length reduction (2LB) that arises from the presence of flex circuit 288 cancels out the perimeter length addition (2LA) that arises from the presence of dock connector 20 (i.e., lengths LA and LB may be substantially equal).

As shown in FIG. 9, components such as microphone 244, button 320, and speaker 316 may also overlap with slot 70. These components may be prevented from significantly altering the value of slot perimeter P by using isolation circuitry. For example, inductors may be placed on the leads of microphone 244 (e.g., in circuitry 328). Similarly, inductors may be placed on the leads of speaker 316 (e.g., in circuitry 314). Inductors may also be placed on the leads of button 320 (see, e.g., components 330). At low frequencies, such as at frequencies in the kilohertz range and below, which includes the audio frequencies handled by microphone 328 and speaker 316, the inductors allow current to pass freely (i.e., the inductors act as short circuits). At radio frequencies (i.e., at 300 MHz or more, and particularly at frequencies of 850 MHz to 2.4 MHz or greater), the inductors have a large impedance and act as open circuits, thereby isolating microphone 244, speaker 316, and button 320. When microphone 244, speaker 316, and button 320 are isolated from the radio-frequency signals, microphone 244, speaker 316, and button 320 do not affect the value of perimeter P for slot 70 and do not load the resonating elements 54-1A and 54-1B.

The isolating inductors that are used to isolate electrical components such as microphone 244, speaker 316, and button 320 may be conventional wire-wrapped inductors or may be somewhat smaller inductors of the type that are sometimes referred to as ferrite chip inductors. An advantage of using ferrite chip inductors is that they have a small size. An advantage of using conventional wire-wrapped inductors is that they tend not to create the types of losses that might arise when using ferrite chip inductors in close proximity to resonating elements.

Figure 22:
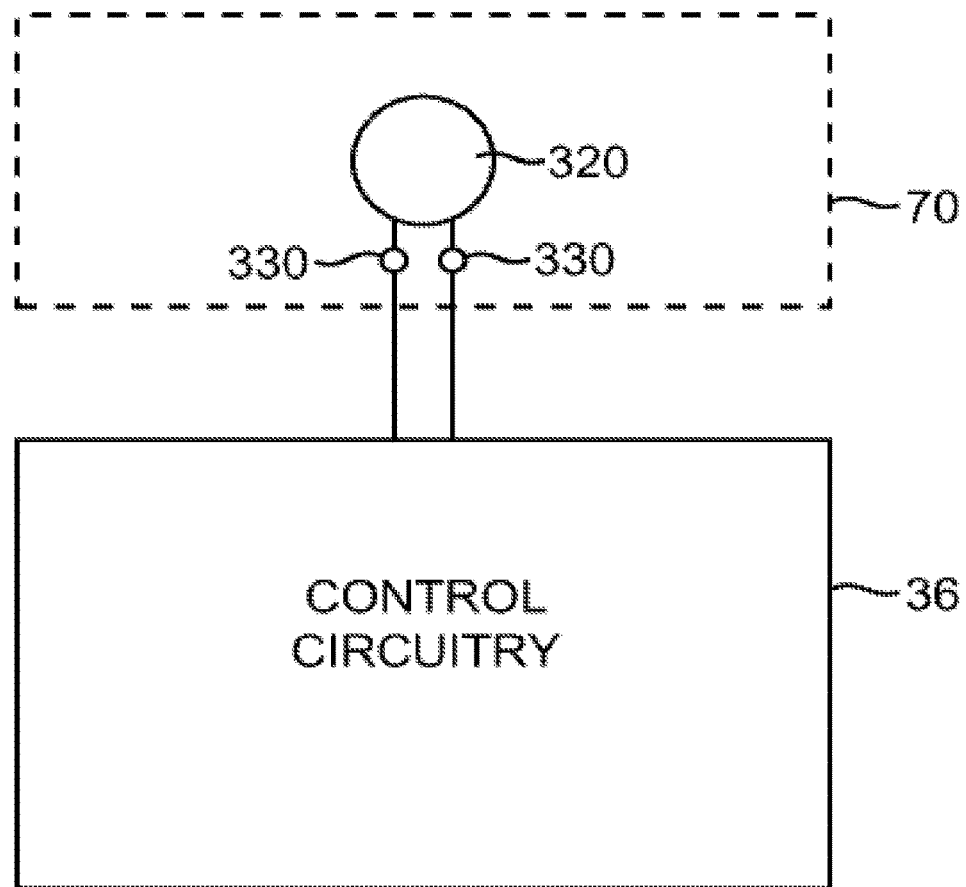
FIG. 22 is a circuit diagram showing how isolation elements may be used to interconnect a menu button with control circuitry in an illustrative handheld electronic device in accordance with an embodiment of the present invention.

If desired, components such as microphone 244, speaker 316, and button 320 can be isolated using isolation elements other than inductors, such as resistors. As shown in FIG. 22, button 320 may, as an example, be isolated using isolation elements 330 (e.g., resistors). Resistors 330 may be placed on the leads of button 320 between button 320 and control circuitry 36 (e.g., where shown by components 330 in FIG. 9). In a fully assembled handheld electronic device, button 320 may overlap resonating elements.

The close proximity of button 320 and the resonating elements can create losses. Moreover, the overlap between button 320 and slot 70 can affect the shape of slot 70 and its perimeter P, potentially affecting the location of the resonant peak of the handheld device transceiver. By selecting resistors 330 of sufficient size, the impact of button 320 on perimeter P can be eliminated or substantially reduced and the possibility of losses due to the close proximity of button 320 and the resonating elements can be eliminated or substantially reduced.

With one suitable arrangement, the values of resistors 330 may be about 3000 ohms. This value is sufficiently high to at least partially isolate button 320, while allowing direct current (DC) control signals (e.g., relatively low frequency button press signals in the kilohertz range or lower) to pass from button 320 to control circuitry 36. Although described primarily in the context of isolating menu button 320 from radio-frequency signals, resistors may be used to isolate any suitable type of electrical component that is potentially subject to radio-frequency interference (e.g., any other electrical component that overlaps slot 70 and/or resonating elements).

Figure 23:
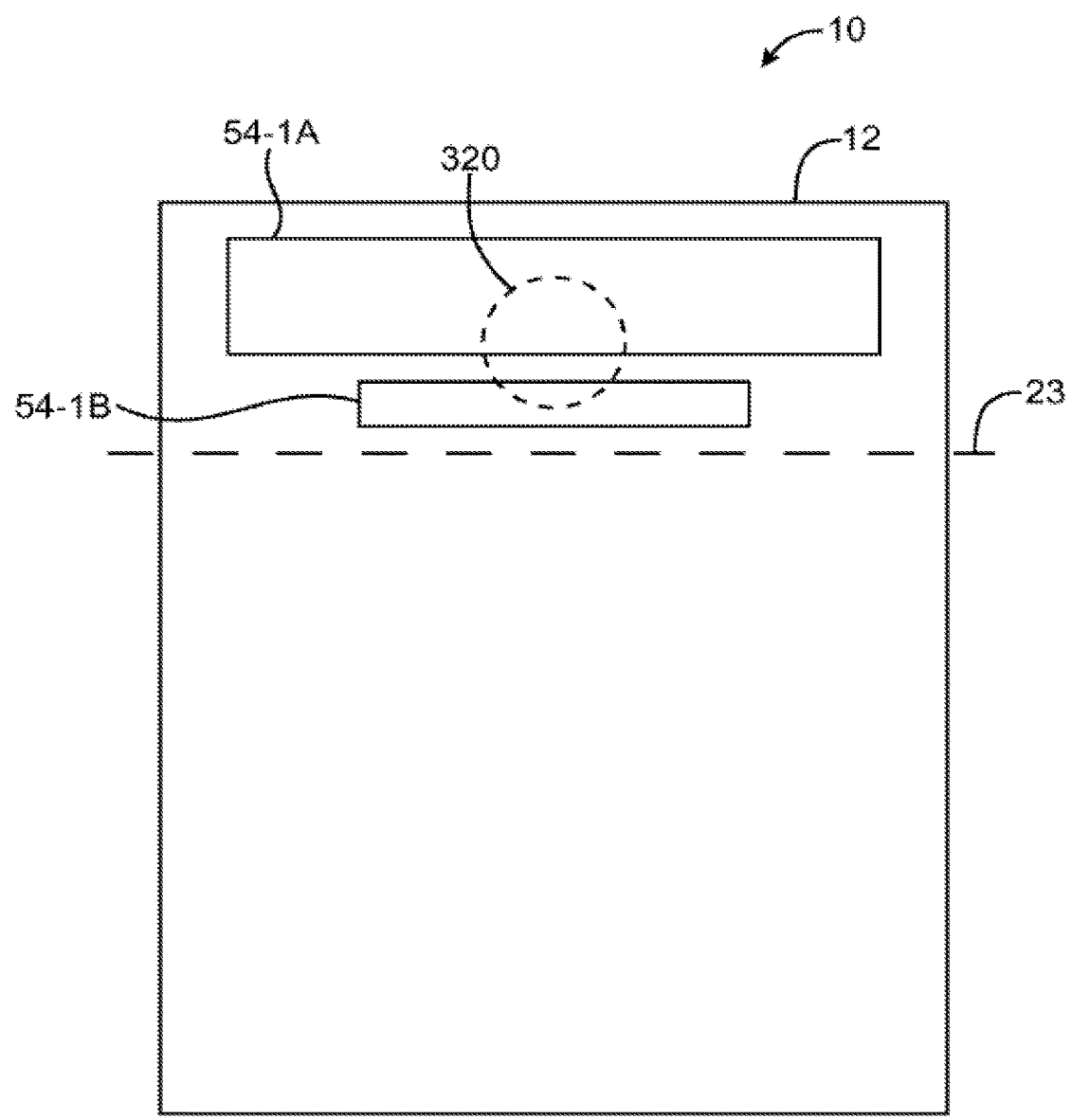
FIG. 23 is a top view of an illustrative handheld electronic device showing overlap between an electronic component and resonating elements in accordance with an embodiment of the present invention.

FIG. 23 shows how an electronic component such as menu button 320 may overlap resonating elements 54-1A and 54-1B (i.e., in a top view from the front face or rear face of device 10).

Figure 24:
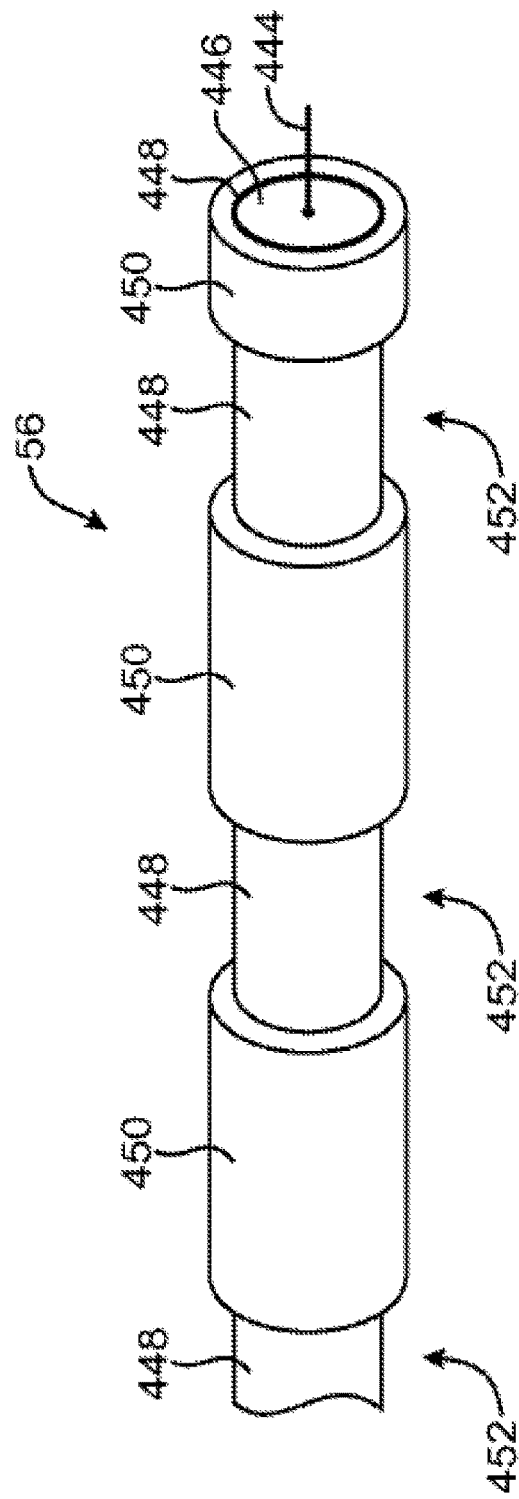
FIG. 24 is a perspective view of a section of coaxial cable with exposed segments and insulated segments in accordance with an embodiment of the present invention.

FIG. 24 shows an illustrative coaxial cable of the type that may be used for coaxial cables 56A and 56B in handheld electronic device 10. As shown in FIG. 24, cable 56 may have a center conductor 444. Dielectric layer 446 may surround center conductor 444. Ground conductor 448 may surround dielectric layer 446. Segments of insulator 450 may surround ground conductor 448 at one or more locations along the length of coaxial cable 56. Cable 56 may have one or more exposed (bare) segments of ground conductor 448 at one or more locations 452 along the length of cable 56. At least some of locations 452 may be spaced so that they are equidistant from each other. If desired, some of locations 452 may be spaced at locations that are not equidistant with respect to each other. There may be any suitable number of locations 452 (e.g., one, two, three, more than three, etc.). There may also be any suitable number of insulating segments 450 (e.g., no segments, one segment, two segments, three segments, more than three segments, etc.). Ferrules 226 or other suitable conductive fasteners may be crimped or otherwise mechanically and electrically attached to ground conductor 448 of cable 56 in locations 452. If desired, additional layers of material (e.g., insulating and conductive material) may be included in cable 56. The layers of insulator and conductor that are shown in FIG. 24 are merely illustrative.

Cables such as cable 56 of FIG. 24 with alternating exposed ground conductor and insulated segments may be formed using any suitable technique (e.g., by selectively covering a bare cable with insulating segments, by selectively stripping an insulated cable, or by using a combination of these techniques). Insulating materials that may be used in cable 56 include polytetrafluoroethylene, polyvinylchloride, etc. Conductive materials that may be used in cable 56 include copper, aluminum, metallized polyester tape, etc.

The foregoing is merely illustrative of the principles of this invention and various modifications can be made by those skilled in the art without departing from the scope and spirit of the invention.

What is claimed is:

1. A method of using a wireless communications device having a front surface, sides, and back, the method comprising:
   receiving and sending radio frequency (RF) signals through RF circuitry for wireless communications, wherein the RF circuitry includes an RF transceiver;
   accepting input through contact with a touch sensor integrated with a display of the wireless communications device, wherein the display includes a glass element having an exposed surface that is planar with the front surface of the wireless communications device;
   converting the contact with the touch sensor into commands for the wireless communications device; and
   accepting input commands for the wireless communications device from a button integrated into the exposed surface of the glass element of the display.

2. The method of claim 1, further comprising:
   creating sound through a speaker integrated in the wireless communications device.

3. The method of claim 1, further comprising:
   receiving voice commands through a microphone integrated in the wireless communications device.

4. A wireless communications device having a front surface, sides, and back, the wireless communications device comprising:
   radio frequency (RF) circuitry configured to receive and send RF signals for wireless communications, wherein the RF circuitry includes an RF transceiver;
   a display, wherein the display includes at least one touch sensor integrated with the display, wherein the display is configured to accept input through contact with the touch sensor, wherein the display converts the contact into commands for the wireless communications device, and wherein the display includes a glass element having an exposed surface that is planar with the front surface of the wireless communications device; and
   a button integrated into the exposed surface of the glass element of the display, wherein the button is configured to accept input commands for the wireless communications device.

5. The wireless communications device of claim 4, further comprising a speaker configured to create sound.

6. The wireless communications device of claim 4, further comprising a microphone configured to receive voice commands.

7. The wireless communications device of claim 4, further comprising:
   a metal element that defines at least a portion of the sides of the wireless communications device.

8. The wireless communications device of claim 7, wherein the display is secured relative to the metal element.

9. The wireless communications device of claim 7, wherein the metal element surrounds a periphery of the wireless communications device.

10. The wireless communications device of claim 7, wherein the metal element is formed from aluminum.

11. The wireless communications device of claim 4, wherein the display covers most of an available surface area on the front surface of the wireless communications device.

12. The wireless communications device of claim 4, wherein the button is round.

13. The wireless communications device of claim 4, wherein the display include a liquid crystal display.

14. The wireless communications device of claim 4, wherein the display includes an organic light emitting diode display.

15. The wireless communications device of claim 4, wherein the button includes an electrical assembly.

16. The wireless communications device of claim 15, wherein the electrical assembly includes a switch and a flex circuit.

17. The wireless communications device of claim 4, further comprising:
   a cover at the back of the wireless communications device, wherein the cover is formed from a dielectric material.

18. The wireless communications device of claim 17, wherein the dielectric material is plastic.

19. The wireless communications device of claim 4, wherein the display includes an outermost layer and wherein the outermost layer of the display is the glass element.

20. The wireless communications device of claim 4, further comprising:
   an ambient light sensor mounted behind the glass element of the display.

* * * * *